United States Patent [19]
Vercellotti et al.

[11] 3,820,073
[45] June 25, 1974

[54] SOLID STATE REMOTE METER READING SYSTEM HAVING NON-VOLATILE DATA ACCUMULATION

[75] Inventors: Leonard C. Vercellotti, Verona, Pa.;
James S. Britton, Raleigh, N.C.;
Louis G. Ottobre, Murrysville, Pa.;
James R. Cricchi, Catonsville, Md.

[73] Assignee: Westinghouse Electric Corporation, Pittsburgh, Pa.

[22] Filed: Sept. 22, 1972

[21] Appl. No.: 291,469

[52] U.S. Cl............. 340/151, 340/188 R, 340/204
[51] Int. Cl............................................. G08c 19/28
[58] Field of Search................................... 340/151

[56] References Cited
UNITED STATES PATENTS

| | | | |
|---|---|---|---|
| 3,170,150 | 2/1965 | Kelar | 340/151 |
| 3,313,160 | 4/1967 | Goldman | 340/151 |
| 3,541,513 | 11/1970 | Paterson | 340/151 |
| 3,656,112 | 4/1972 | Paull | 340/151 |
| 3,731,277 | 5/1973 | Krutz | 340/151 |

Primary Examiner—Thomas B. Habecker
Attorney, Agent, or Firm—R. W. Smith

[57] ABSTRACT

A solid state remote meter reading system includes modular metering chip circuits for counting meter initiated pulses and automatically transmitting encoded meter data pulses. Each metering circuit module includes readout control and data accumulation portions. A binary non-volatile counter in the accumulator portion stores the meter data during power outages. The read-out control portion encodes a data word format for asynchronous data out transmission. Outputs from the read-out control portions of each module are interconnected in a series cascaded relationship to form a common system output for connection to a transmission line. This permits universal use of the metering circuit modules in systems having any required number of meters at a remote location.

10 Claims, 10 Drawing Figures

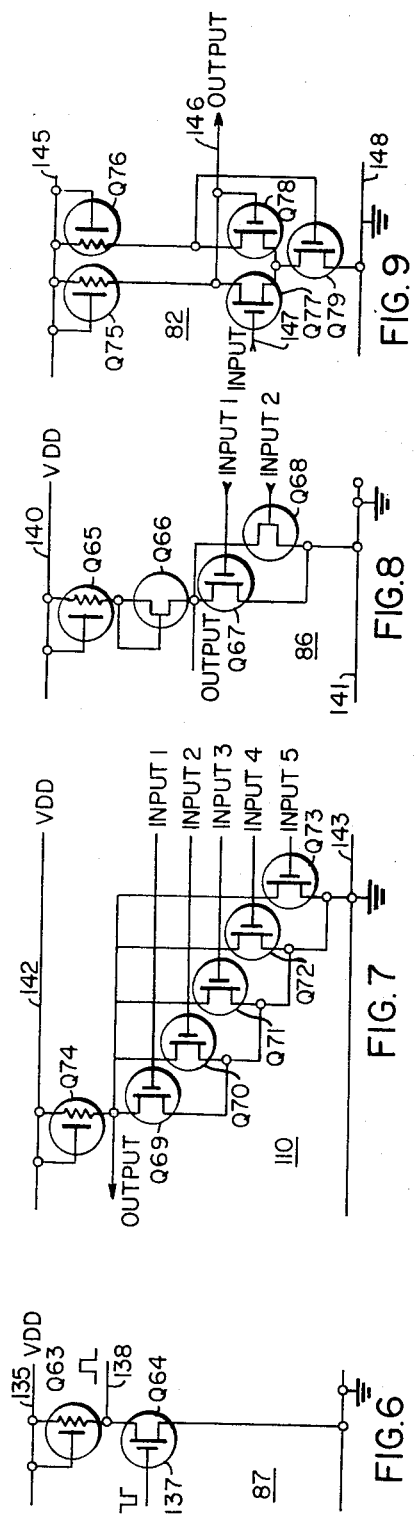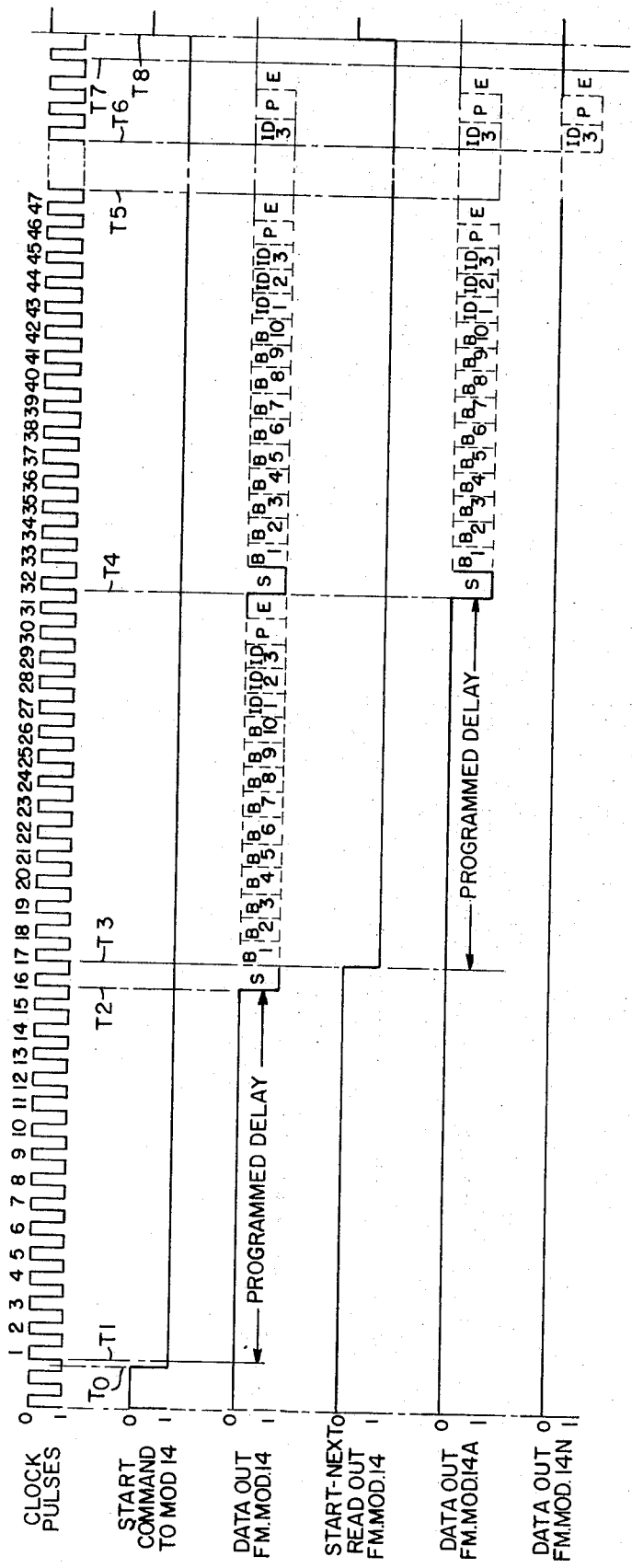
FIG.6  FIG.7  FIG.8  FIG.9  FIG.10

SOLID STATE REMOTE METER READING SYSTEM HAVING NON-VOLATILE DATA ACCUMULATION

BACKGROUND OF THE INVENTION

This invention is related to remote meter reading systems and more particularly to such a system having solid state data accumulator and readout control circuits for non-volatile storage of meter initiated pulses and automatic transmission of encoded meter information signals.

It is well known to provide for remote reading of integrating type meters utilized at individual dwellings by gas, water and electric utility companies. One such system is disclosed in U.S. Pat. application Ser. No. 18,188 for a Method and Apparatus for Transmitting Information in Meter Reading filed Mar. 10, 1970 assigned to the assignee of this application. The meters utilizes in utility metering typically have a mechanical register and/or associated electronic pulse initiator for indicating a given quantity which has been consumed, that is, a predetermined number of kilowatt hours for electricity or predetermined volume in cubic feet of water or gas. The meter pulses must be accumulated and encoded in a suitable format for transmission, decoding and utilization at a central billing location, typically processing the meter data by means of digital computing devices.

Often, mechanical devices are utilized to encode the meter data in analog to digital converters such as disclosed in U.S. Pat. application Ser. No. 85,514 for a Meter Reading System Having Digital Encoder, filed Oct. 30, 1970, and assigned to the assignee of this application. These devices are not desirable in certain applications where there are space limitation or large numbers of meters are to be read remotely. In electronic encoding circuits, such as counters and matrix networks, the meter data is often lost by power outages which remove bias voltages or cause loss of electrically charged conditions.

In other instances, the meter initiated pulses are stored on a recording medium such as magnetic tape as described in U.S. Pat. application Ser. No. 887,682 for a Reverse Direction Tape Translation System filed Dec. 23, 1969 and assigned to the assignee of this invention. This requires physical transport of the data recordings to the central billing location or complicated adaptation for connecting to a data transmission system to send to a distant billing site. Further, many existing systems do not accumulate and encode the meter information so that is is readily received by digital computers nor is the readout data information readily accepted by conventional data transmission lines or telecommunication systems such as telephone lines. Where the meter data is to be sent on a shared basis over existing telecommunication systems, it is necessary that the meter information be accessed quickly and fed over such systems in a minimum of elapsed time.

SUMMARY OF THE INVENTION

In accordance with the present invention, a solid state remote meter reading system has a remote metering circuit module including a combined data accumulator, having a non-volatile binary counter, and a readout control formed on a common integrated circuit chip. Each meter initiates pulses to the non-volatile counter of an associated remote metering module through an input circuit for conditioning and properly setting the meter pulse into the counter. A parallel-to-serial converter encodes the data count stored in the non-volatile counter. The readout control feeds clock pulses upon receipt of an interrogating pulse, to a readout control counter for sampling and initiating a synchronous binary word transmission from the parallel to serial converter and through an output buffer circuit. The combined data accumulator and readout control circuit arrangement includes a binary data word format having synchronizing and end bit positions and information bit positions including meter data, meter identification and parity checking.

A remote metering circuit module is provided for each of plural meters to be monitored at a remote location and is made by large scale integrated circuit techniques on single semiconductor wafer including commonly formed metal-nitride-oxide semiconductor (MNOS) transistors. Each module is connected to a separate meter and also to the other modules in a cascaded interconnected relationship. The stored information of each module is read out upon command by an interrogating signal in a consecutive serial sequence defining a continuous data bit stream to a transmission line.

It is an important feature of this invention that the combined data accumulator and readout control circuit arrangement is provided in a modular package which is adapted for use as an independent unit or interconnection with other like modules for universal application utilizing a single power supply and a common readout output in remote meter reading systems having from one to hundreds of meter data inputs. Another important feature of this invention is to provide a data word format for providing asynchronous data transmission for decoding by central billing computers without the need of also transmitting clocking pulses over a transmission line system.

A further feature of this invention is to provide a programmed predetermined delay between the time of receiving an interrogating signal and transmission of the first data word readout such that the predetermined delay is directly related to the length of the data word format and further such that the predetermined delay is utilized to automatically and cyclically initiate the data word readouts of cascade connected remote metering chip modules in a consecutive sequence. A still further feature of this invention is to provide an external reset circuit control for initially establishing coincident meter data counts in the non-volatile counter and an associated mechanical self-resettable meter register. A still further feature of this invention is a remote meter reading system which is compatible with conventional communication transmission systems including telephone transmission lines.

And a still further feature of this invention is that it is formed of a minimum of basic circuit components made by mass production techniques in modular packages so as to facilitate installation and servicing and having a non-volatile memory of the encoded meter data so as to not require servicing or resetting upon power outages. This later feature eliminates the need for auxiliary or standby power supplies and convenient use of conventional electrical power already available at the remote metering location. The use of conventional electrical utility furnished power is further advantageously utilized by operating the remote meter reading system at data clocking rates corresponding to the power line frequencies, if desired.

These and other advantages of the present invention will be apparent from the description of a preferred embodiment illustrated in the drawings.

BRIEF DESCRIPTION OF THE DRAWINGS

FIG. 6 is a schematic circuit diagram of an inverting circuit shown in FIG. 3;

FIG. 7 is a schematic circuit diagram of a gating circuit shown in the schematic diagram of FIG. 3;

FIG. 8 is a schematic circuit diagram of another gating circuit included in FIG. 3;

FIG. 9 is a schematic circuit diagram of a pulse shaping circuit included in the schematic diagram of FIG. 3; and FIG. 10 is a timing chart of pulse logic signals occurring at the inputs and outputs of circuits shown in FIGS. 2 and 3.

DESCRIPTION OF THE PREFERRED EMBODIMENT

Figure 1:
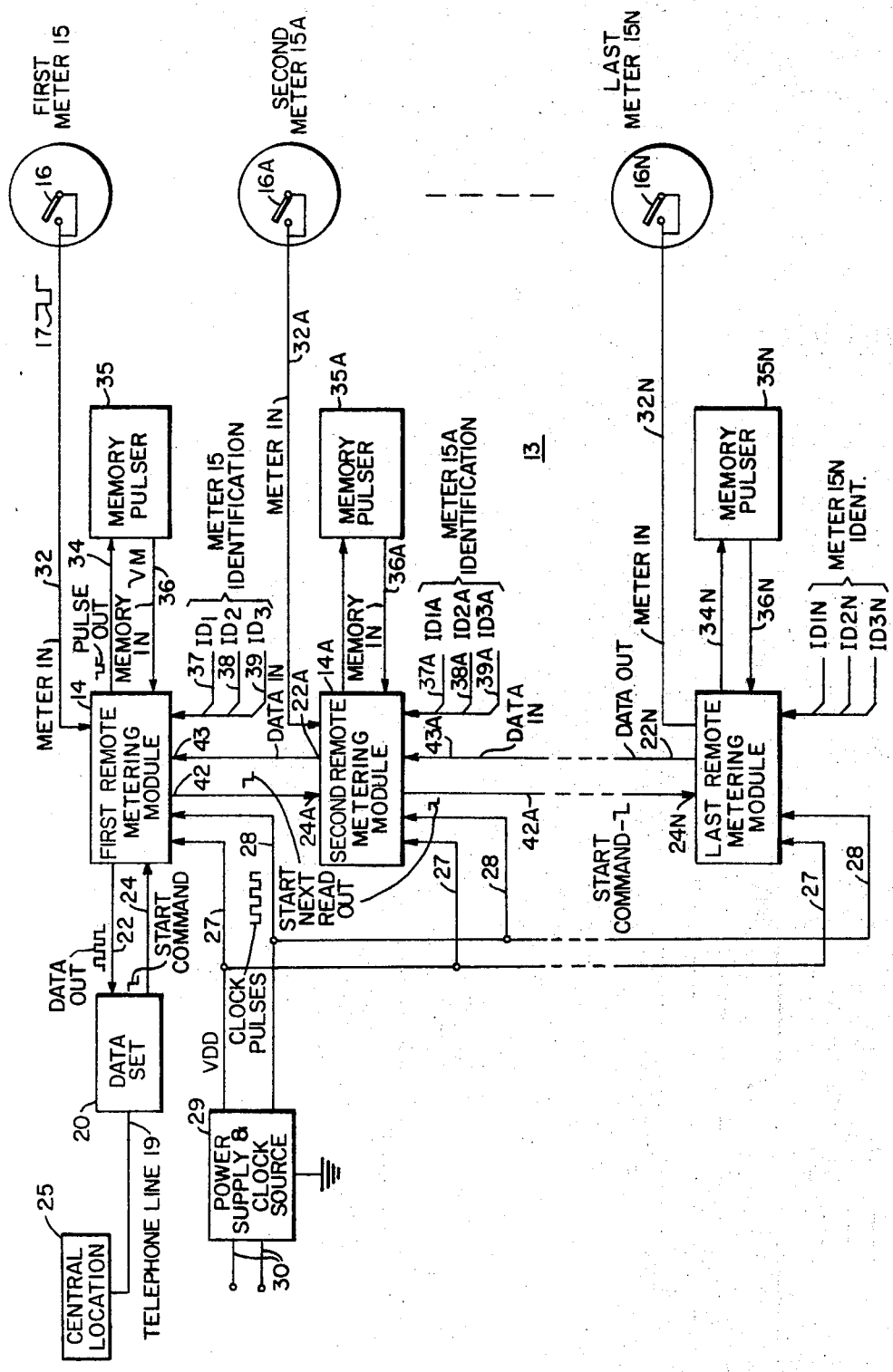
FIG. 1 is a functional block diagram of a remote meter reading system including plural solid state remote metering circuit modules made in accordance with this invention.

Referring now to the drawing and more particularly to FIG. 1 where there is illustrated a functional block diagram of a remote meter reading system 13 including solid state remote metering circuit modules 14, 14a, and 14n each having a combined non-volatile data accumulator and readout control integrated circuit arrangement made in accordance with the present invention. Meters 15, 15a, and 15n are shown where the meter 15n may be the last of any desired number of meters to be monitored at a remote location by the system 13. 288 metering modules and associated meters have been used in one working embodiment at a common remote meter data encoding location such as found in an apartment building having a large number of dwelling units each with separate metered utilities.

The meters 15, 15a and 15n include integrating type electrical gas, and/or water meters. Each meter includes a pulse initiator 16 which generates a meter pulse 17. In a working embodiment, a pulse 17 is generated for each 10 kilowatt hours indicated by an associated mechanical dial register, not shown, of the meter 15 being an electrical watthour meter. The pulse initiator 16 may be of the type disclosed in U.S. Pat. application Ser. No. 816,503 filed Apr. 16, 1969 and assigned to the assignee of this invention.

The first metering module 14 is connected to a transmission line 19 which may be a telephone line through a transmitter-receiver which includes a data set 20 capable of receiving data out signals on an output 22 of the remote metering module 14. High and low voltage levels associated with the data out signals are converted to different tones having predetermined frequencies. The data set 20 is typically furnished as a termination of the transmission line 19 and is adapted to transmit a start command signal to the remote metering module 14 on an input 24 in response to an interrogating signal supplied over the transmission line 19 from a central billing location.

The combined solid state data accumulator and readout control circuit arrangement of each metering module includes an important feature of this invention. The modules 14, 14a and 14n are identical including solid state elements on common semiconductor substrates or chips as described hereinbelow with each being provided for each meter to be monitored. Accordingly, the first remote metering circuit module 14 is connected to the meter 15 as each module is connected to separate meter through to the last metering module 14n which is connected to the last meter 15n. The metering modules are easily connectable to systems having various numbers of meters for monitoring and encoding as described hereinbelow.

The first remote metering module 14 is referred to hereinafter, it being understood that all metering modules are alike. A power supply input 27 is applied to each metering module power signal VDD relative to supply a negative 25 volts to ground power signal VDD. A clock pulse input 28 is applied to synchronize the data counting, encoding and read out functions of the metering module. The clock pulses and power signal VDD are supplied from a single power supply source 29 energized by a pair of conventional power line conductors 30 normally provided by an electrical utility electrical service at 60 Hz. The meter initiated pulses 17 are applied to a meter in input 32 and in turn are conditioned by the remote metering module 14 for counting and for generating a pulse out signal through output 34 to an external memory pulser 35.

Storage of a meter pulse count is controlled by a memory clear/write pulse VM generated in the memory pulser 35 on a memory in input 36 to establish a non-volatile storage in the metering module 14. Three meter identification inputs 37, 38 and 39 are applied to each metering module 14 for binary encoding in the data word format along with the stored meter information as also described further hereinbelow.

The remote metering modules 14, 14a and 14n are connected together in a series cascaded relationship such that a complete readout cycle is initiated by start-next-readout signals on each output 42 from a preceding to a following connected metering module. The output 42 provides the start command input 24 to a following metering module. Also, the data out output 22 of each metering module is connected from a following metering module to the data in input 43 of the preceding one as shown in FIG. 1 to complete the cascaded connected relationship therebetween. Accordingly, upon receipt of a start command signal, a data word readout is provided over the transmission line 19, first from the metering module 14 followed in consecutive order the data word outputs from the metering modules 14a through 14n.

Figure 2:
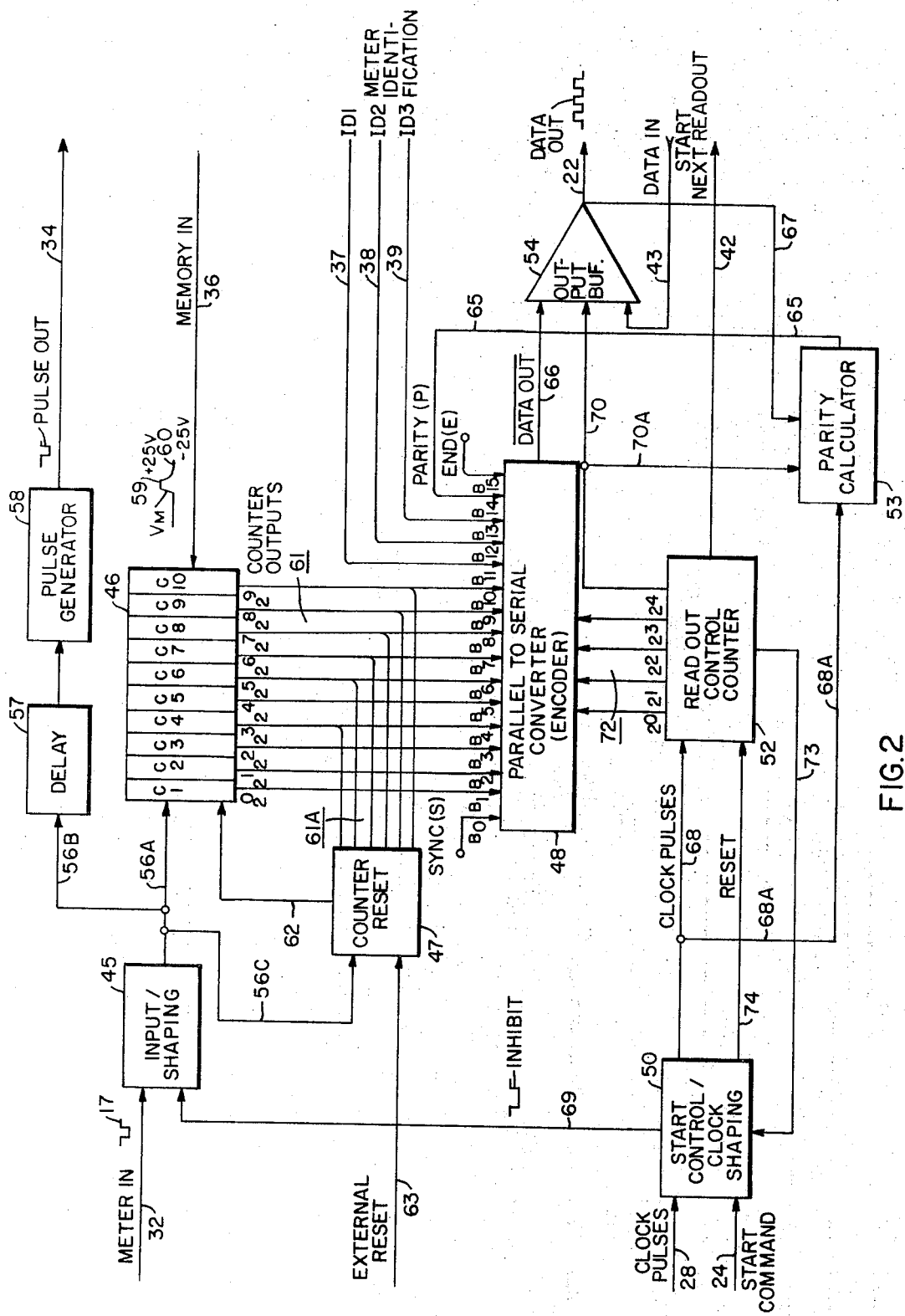
FIG. 2 is a functional block diagram of one of the solid state remote metering modules shown in FIG. 1.

Having briefly described the solid state remote meter reading system 13, reference is now made to FIG. 2 illustrating a functional block diagram of a typical remote metering circuit module 14. The solid state elements forming the circuits indicated in the blocks in FIG. 2 are all formed of semiconductor transistor elements fabricated by integrated circuit techniques of metal-nitride-oxide-semiconductor (MNOS) type field effect transistors (FET) utilizing p-channel configuration and operable in the enhancement mode. Devices of this type having a memory capability are described in U.S. Pat. application Ser. No. 219,463 filed Jan. 20, 1972 and assigned to the assignee of this invention. These insulated-gate FET devices are formed on a single semiconductor wafer or chip of N-type silicon forming the substrate of the metering module 14. The metering module 14 in the working embodiment illustrated is housed in a dual-in-line package having 16 terminal pins to form a convenient modular packaged unit. It is contemplated that several, such as groups of 3 to 50, of the metering modules 14 may be fabricated on a single chip in accordance with large scale integration (LSI) techniques.

Each remote metering module 14 includes an accumulator circuit portion and a readout control circuit portion. The accumulator portion includes an input/shaping circuit 45, a ten stage non-volatile binary counter 46, a counter reset 47 and a parallel-to-serial converter referred to hereinafter as encoder 48. The readout control portion of the metering module 14 includes a start control/clock shaping circuit 50, a readout control counter 52, a parity calculator 53 and an output buffer 54.

The accumulator portion counts the meter pulses 17 and concurrently stores the count of the totalized meter pulses in a binary coded count so it coincides with the mechanical dial register indication of the associate meter and is ready for encoded readout transmission. The metering module 14 is not limited to meters having mechanical registers since the pulses 17 may be developed from any integrating type meter device or circuit. Outputs 56A, 56B, and 56C of the input circuit 45 are responsive to each meter pulse 17 to add an additional count in the non-volatile counter 46 and generate the pulse out signal on output 34 to establish non-volatile memory of the updated count. A delay circuit 57 receives the meter pulse 17 from output 56B and is connected to a pulse generator 58 which develops the pulse out signal on output 34 having a predetermined pulse duration in response to the pulse 17. The pulse out signal is applied to the memory pulser 35 on output 34 as illustrated in FIG. 1. The leading edge of the pulse out signal initiates memory clear/write pulse VM which has an initial positive voltage pulse level 59 and the trailing edge terminates at a negative voltage pulse level 60 of the pulse VM in the memory pulser 35 which is coupled to the input 36. These pulse levels 59 and 60 provide memory clearing and memory set or write operations in the non-volatile counter 46 with each meter pulse 17 as described further hereinbelow.

The non-volatile counter 46 includes ten identical states C1 through C10 having two stable logic states so as to have a maximum binary count corresponding to a decimal count of 1,024 on the $2^0$, $2^1$, $2^2$, $2^3$, $2^4$, $2^5$, $2^6$, $2^7$, $2^8$, and $2^9$ binary number counting outputs 61 thereof as is well understood by those skilled in the art.

The counter reset circuit 47 has inputs connected to the $2^3$, $2^5$, $2^6$, $2^7$, $2^8$ and $2^9$ counter outputs 61A so as to initiate a reset cycle back to the counter 46 on line 62 when the non-volatile counter 46 reaches the count of 1,000. This coincides with the resetting of the dial reading of registers usually associated with a meter 15. An external reset signal input 63 is provided in addition to those described in FIG. 1 to initiate a reset function from the circuit 47 to the non-volatile counter 46 when it is desired to initially set the counter to coincide with a zero meter dial setting. An output line 56C of the input/shaping circuit 45 is connected to the counter reset circuit 47 so as to perform an internal resetting circuit function within the counter reset circuit 47 following a counter resetting signal generated therefrom on output 62.

The accumulator portion of the remote metering circuit module 14 is completed by the encoder 48. 16 inputs representing each data bit logic to be encoded for parallel to serial data conversion are shown as parallel inputs along the top of the block of the encoder 48 in FIG. 2. The encoded binary data word format includes 16 bit positions starting with B0 including a synchronizing bit S shown functionally as an input although provided internally. Ten meter reading data bits are included in the word bit positions B1, B2, B3, B4, B5, B6, B7, B8, B9 and B10 and are provided by the $2^0$, $2^1$, $2^2$, $2^3$, $2^4$, $2^5$, $2^6$, $2^7$, $2^8$, $2^9$ outputs respectively, of the non-volatile counter 46. Three meter identification bits ID1, ID2 and ID3 are included in the bit positions B11, B12, and B13 and are applied on the lines 37, 38 and 39. A parity bit P is included in the bit position B14 in accordance with the output 65 of the parity calculator 53. The last bit position B15 represents the end bit E of the encoder data word. The data word format just described is tabulated in the following table:

DATA WORD FORMAT

| Bit position | B0 | B1 | B2 | B3 | B4 | B5 | B6 | B7 | B8 | B9 | B10 | B11 | B12 | B13 | B14 | B15 |
|---|---|---|---|---|---|---|---|---|---|---|---|---|---|---|---|---|
| Bit logic | S | $2^0$ | $2^1$ | $2^2$ | $2^3$ | $2^4$ | $2^5$ | $2^6$ | $2^7$ | $2^8$ | $2^9$ | ID1 | ID2 | ID3 | P | E |
| Function | SYNC | Meter Data Count | | | | | | | | | | Meter Ident. | | | PARITY | END |

A synchronous serial data word transmission is initiated by the read control circuit portion of the module circuitry. An output 66 from the encoder 48 to the output buffer 54 develops the above described data word format for transmission over the data out output 22. An output 67 from the output buffer 54 provides sampling of the logic states of each bit position of the data word so that the parity bit P is provided on the parity calculator output 65 back to the encoder 48.

The readout control circuit portion of the metering module 14 receives the start command signal and the clock pulses from the inputs 24 and 28, respectively, at the start control/clock shaping circuit 50. The clock pulses are gated to the readout control counter 52 on output 68 and to the parity calculator 53 on output 68A when the start command signal is received. An input inhibit signal is applied from the start control/shaping circuit 50 to the input/shaping circuit 45 on output 69. Readout control counter 52 has five binary counter states A through E having $2^0$, $2^1$, $2^2$, $2^3$ and $2^4$ binary number counting outputs and develops a maximum count of 32. Each count occurs at a positive transition of a clock pulse.

The control counter 52 provides a programmed readout delay following a start command signal from between 15 to 16 clock pulse cycles (or exactly the count of 16 within counter 52) before initiating readout of the data word from encoder 48 on output 66 and the start next readout signal on the line 42. The $2^4$ counting output of the circuit 52 develops a signal on the outputs 70 and 70A, following the readout control counter delay of 16 counts, to enable the output buffer 54 thereby gating the data word readout from the output 66 to the data out output 22 and also enabling operation of the parity calculator 53. The seventeenth through the thirty-first counts are provided on the four outputs 72 from the counting outputs $2^0$ through $2^3$ to the encoder 48 for sequentially sampling the logic state of the 16 bit positions B0 through B15. This provides the serial data word readout to the output buffer 54 and to the data out output 22. The readout control counter output 73 to the start control/clock shaping circuit 50 provides a signal effective to maintain the inhibit signal on the circuit 50 output 69 during the time that a data word is being read out from the encoder 48 by the readout control counter 52. This prevents meter signals 17 from changing the count accumulated by the non-volatile counter 46 during the readout time interval. An output 74 from the circuit 50 to the readout control counter 52 provides a reset input on to the counter 52.

The parity calculator 52 is triggered by the clock pulses from the output 68A of the circuit 50 to sample the logic of the data positions B0 through B15 developed on output 67 and add, if required, a bit so that data word contains an even number of bits of a given logic state, for example the logic "1" state. As noted above, the output buffer 54 provides an output interface for the data word output from a remote metering module 14 to the data out output 22. A further important function of the output buffer 54 is to pass the data word readouts from the data in input 43 which is connected in series to the following cascade connected metering modules. The signal on output 70 of the counter 52 keeps the output buffer 54 enabled for passing subsequent data word readouts to the data out output 22 from all following remote metering circuit modules.

Figure 3:
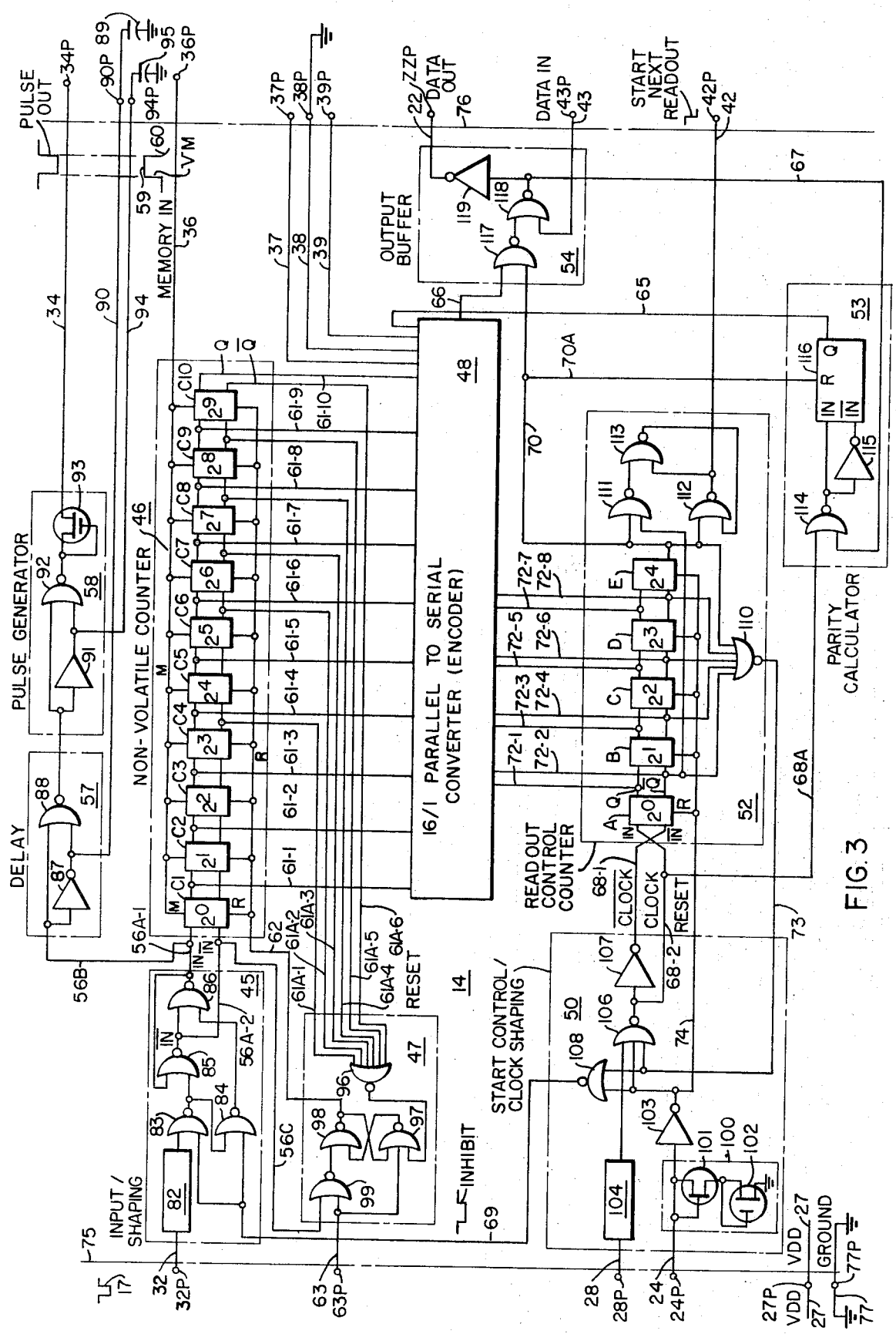
FIG. 3 is a logic schematic diagram of the remote metering module shown in FIG. 2.

Referring now to the logic block schematic diagram of FIG. 3, the logic block symbols for gating, inverting, and counting circuits of the metering chip 14 are shown in the corresponding blocks illustrated in FIG. 2. The circuits represented by the logic symbols are formed of the MNOS elements on a single semiconductor chip as noted hereinabove and are described more fully in connection with the description of FIGS. 4, 5, 6, 7, 8 and 9.

External connections to the circuits of the metering module 14 are provided at the series of terminal pins associated with package of each chip and are illustrated in vertical rows along the module interfaces 75 and 76 shown at left-hand and right-hand sides, respectively, in FIG. 3. The terminal pins of the metering module for external connection are designated by the numerical designation of the corresponding input and outputs shown in FIG. 2, followed by the letter p. The conductor lines of FIG. 3 also correspond to the functional input and output lines of FIG. 2 by use of the same numerical designation followed by a dash and added numerical notation when additional conductors of the same logical function are used. The logic operation described hereinafter is with the "1" and "0" logic states substantially corresponding to the VDD supply signal of a nominal −25V and ground source of zero volts (OV).

The VDD supply signal is connected to the terminal pin 27P and the circuit ground is connected at the terminal pin 77P by a conductor 77 to a source of ground. Accordingly, the transitions between the "0" to "1" logic states causes the voltage level to go negative and opposite transitions between the "1" and "0" logic states causes voltage level to go positive. This provides negative logic which is used throughout the gating and logic circuits on the metering module 14 described hereinafter.

The input/shaping circuit 45 receives the meter pulse 17 on pin 32P at a variable threshold pulse shaping circuit 82 having regenerative switching elements shown in FIG. 9 and operating in a bistable manner similar to that of a Schmitt trigger circuit. The regenerative action produces a sharp square wave pulse in response to the meter pulse 17 exceeding the input threshold voltage. A pair of two input NOR gates 83 and 84 in the input/shaping circuit 45 normally permits the "1" to "0" logic transition of the pulse shaping circuit to be gated to the output of the gate 83 as a "0" to "1" logic state in response to a pulse 17. The inhibit signal conductor line 69 is connected to an input of both of the gates 83 and 84 and is at the "0" state in absence of an inhibit signal. This enables the output of the gate 83 to go to the "1" state and this output is coupled to the other input of the gate 84.

An R–S type flip-flop in the circuit 45 is formed by two input NOR gates 85 and 86 with the output of the gate 83 connected to one input of the gate 85 and the output of the gate 86 coupled back to the other input of the gate 85. The two inputs to the gate 86 are from the outputs of the gates 84 and 85. The outputs of the gates 86 and 85 IN and $\overline{\text{IN}}$ are binary counting logic signals connected to the corresponding IN and $\overline{\text{IN}}$ inputs to the non-volatile counter 46 on the output conductor lines 56A–1 and 56A–2, respectively, of the input/shaping circuit 45. The IN logic output is also connected by the conductor line 56B to the delay circuit 57 to initiate a memory cycle in the non-volatile counter 46 for each new meter pulse 17. The $\overline{\text{IN}}$ output is also connected to the counter reset 47 by the conductor line 56C. Accordingly, the IN logic goes from the "0" to the "1" state and the $\overline{\text{IN}}$ logic output goes from the "1" to "0" state in response to a meter initiated pulse 17 to cause an additional count in the circuit 46. If the inhibit signal line 69 is in the "1" state, which occurs during a data word readout cycle as described below, the gates 83 and 84 prevent any meter initiated pulse output of the circuit 82 from producing IN and $\overline{\text{IN}}$ logic outputs and maintain the IN and $\overline{\text{IN}}$ logic inputs to the non-volatile counter 46 at the "0" and "1" states, respectively.

In order to apply a memory clear/write pulse VM from the memory in output conductor line 36 at the terminal pin 36P to the memory input of the non-volatile counter 46, the meter pulse 17 causes the IN logic input to the delay circuit 57 to go from the "0" to the "1" state. The delay circuit 57 includes an inverting circuit 87 having a predetermined pulse delay and a two input NOR gate 88. The inverting circuits such as 87 included in the metering module 14 are shown in FIG. 6. The IN logic input is connected to the inverting circuit 87 and one of two inputs to the gate 88. The output of the inverting circuit 87 is connected to the other input to the gate 88. The output of the gate 88 is delayed by a timing capacitor 89 connected externally through a terminal pin 90P to a conductor line 90 and to the inverting circuit 87. The capacitor value is established in accordance with the time required to ripple through the stages of the non-volatile counter 46 after the IN and IN logic inputs are received at the counter 46. In the preferred embodiment the delay is 100 microseconds.

The pulse generator 58 also includes an inverting circuit 91 and a two input NOR gate 92 both similar to the inverting circuit 87 and gate 88 in the delay circuit 57. An FET transistor 93 connected as a resistance load element is connected in series with the output of gate 92. The load element 93 prevents spurious signals on conductor line 34 from being developed by the output of the pulse generator 58 during power signal transitions.

The input to the pulse generator 58 is connected to the output of the delay circuit 55 which is applied to the inverting circuit 91 and one of the two inputs to the gate 92. The other input to the gate 92 is connected to the output of the inverting circuit 91. The output of the inverting circuit 91 is also connected through conductor 94 to terminal pin 94P for connection to a timing capacitor 95. The pulse width of the pulse VM is determined by the value of the capacitor 95 such that the leading and trailing edges thereof determine the time between the memory clear and write pulse levels 59 and 60. The capacitor 95 provides a 100 microsecond pulse width in the pulse out output pulse in one embodiment.

The operation of the delay circuit 57 and pulse generator circuit 58 is initiated by the IN input on conductor line 56B going from the "0" to the "1" state. The inverting circuit 87 goes from the "1" to the "0" state and the gate 88 output remains at the "0" state. The output of the inverting circuit 91 is at the "1" state and the output of the gate 92 is at the "0" state and therefore the line 34 from the pulse generator 58 is at the "0" state. At the end of the meter initiated pulse 17 the IN input goes to the "0" state. The output of the inverting circuit 87 starts to go to the "1" state but is delayed by the time required to charge capacitor 89. During this charging time the output of gate 88 goes to the "1" state since both inputs are at the "0" state and keeps the output of gate 92 and line 34 at the "0" state. After the 100µs capacitor time delay, the output of the inverting circuit 87 reaches the threshold of the gate 88 so that its output goes back to the "0" state. This causes both inputs to the gate 92 to be at the "0" state as the output of the inverting circuit 91 tries to go to the "1" state but is delayed by the charging of the capacitor 95. This initiates the pulse out output pulse on line 34 which goes to the "1" state as both inputs to the gate 92 are at the "0" state. When the capacitor 95 is charged to the threshold of the gate 92, the output of the inverting circuit 91 goes to the "1" state so that the output of the gate 92 returns to the "0" state, ending the pulse out pulse.

As shown in FIG. 1, the pulse out signal from the pulse generator 58 is applied to the external memory pulser circuit 35 which includes a differentiating circuit and source of +25 V, not shown. The circuit 35 provides the transition to the positive voltage level 59 of the memory pulse VM at the + 25 volt level and the negative voltage level 60 at the level of VDD or − 25 volts in response to the leading and trailing edges or "0" to "1" and "1" to "0" changes, respectively, of the pulse out signal. The positive and negative voltage levels 59 and 60 of signal VM are applied to the metering module 14 through the remote terminal pin 36P and conductor line 36 to the non-volatile counter 46 for providing memory clearing and writing operations in the non-volatile counter 46.

Figure 4:
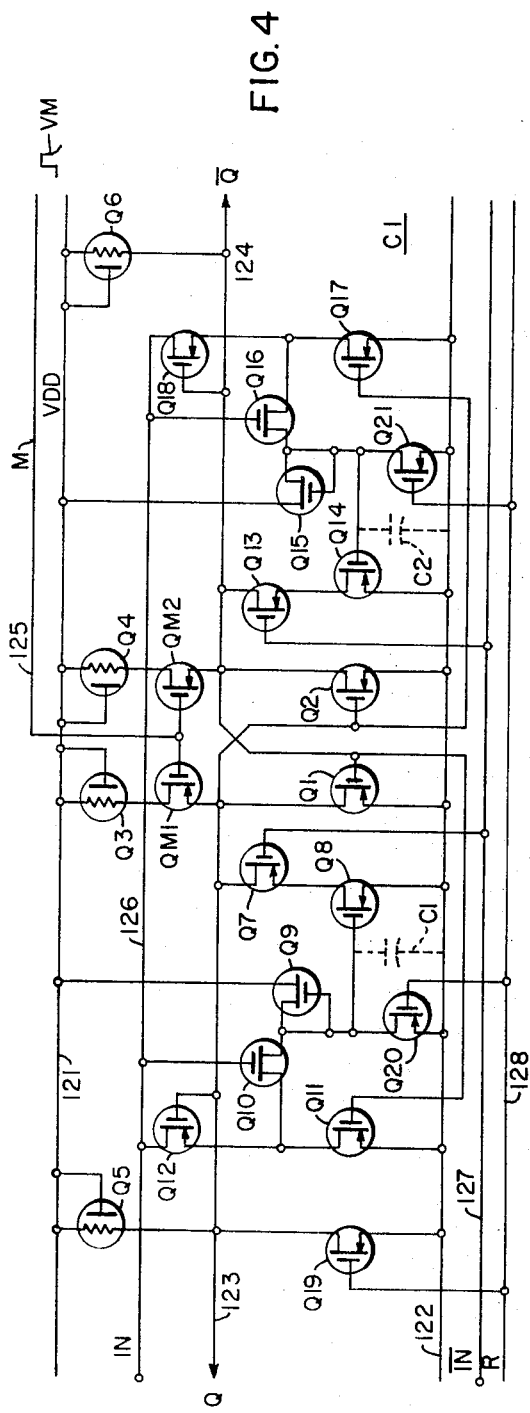
FIG. 4 is a schematic circuit diagram of a non-volatile counter shown in FIGS. 2 and 3.

The ten binary counter stages of the non-volatile counter 46 are designated C1, C2, C3, C4, C5, C6, C7, C8, C9, and C10 in FIG. 3 and a schematic of one, for example C1 is shown, in detail in FIG. 4. These stages provide the $2^0$ through $2^9$ binary meter counting outputs respectively shown in FIG. 2. The non-volatile counter 46 is a 10 bit binary ripple through type for totalizing the accumulation of the meter pulses 17, to maintain a binary count corresponding to the meter pulse counted and to the reading of a mechanical dial register indicating the measured quantity of the associated meter 15. The memory of each counter stage is non-volatile so as to preserve the logic state of each in the event of a power outage of the local power lines 30 connected to the system power supply 29 shown in FIG. 1.

Each counter stage has a memory store input M, indicated at the top of each of the blocks C1 through C10 which are connected to the line 36 to receive the memory clear/write signal VM. Each counter stage also includes IN and IN logic inputs at the left-hand side of each of the blocks and each counter stage has Q and Q̄ logic outputs associated with the $2^0$ through $2^9$ outputs, respectively at the right side of the blocks. Therefore, the Q and Q̄ outputs of the counter stages C1 through C10 are connected in cascaded relationship to the IN and IN inputs, respectively of the counter stages C2 through C10. The IN and IN inputs of the first counter stage C1 provide the inputs, the counter 46 and are connected to the output conductors 56A-1 and 56A-2 of the input/shaping circuit 45, as noted above.

Each Q logic output of the counter stages is connected by the lines 61-1 through 61-10, respectively, to the B1 through B10 bit position inputs of the encoder 48. The Q̄ outputs of stages C4, C6, C7, C8, C9 and C10 are connected to the counter reset circuit 47 by the conductor lines 61A-1 through 61A-6 respectively. Each of the counter stages C1 through C10 includes a reset input R illustrated at the bottom of each counter stage blocks which is connected to a conductor line 62. This conductor applies a counter reset signal from the reset circuit 47 to set all the flip flop sections of the stages C1 through C10 so that a "0" state is at each Q output.

As described further hereinbelow in connection with the description of FIG. 4, each stage of the non-volatile counter 46 includes a MNOS non-volatile memory section as well as bistable flip-flop logic section. Upon the meter pulses 17 changing the IN and IN outputs in the input/shaping circuit 45 from the "0" and "1" states to the "1" and "0" states, respectively, all of the flip-flop sections are rippled during the 100 µ s delay provided by the delay circuit 57. The memory clear operation is provided by the voltage level 59 of the signal VM to the memory section which has two variable bistable threshold levels. The memory write operation is provided by the voltage level 60 of the signal VM as it changes one threshold level relative to the other in the appropriate stages of the non-volatile counter 46 as required to update the memory section to the totalized or accumulated count of a new meter pulse 17. The particular bistable state of each memory section is biased by bistable state of the associated counter stage flip-flop section as more clearly understood from the description of FIG. 4.

The counter reset circuit 47 includes a six input NOR gate 96. These inputs are connected by the conductor lines 61A-1 through 61A-6 to the $\bar{Q}$ outputs of counter stages C4, C6, C7, C8, C9 and C10 to provide a pulse at the output of the gate 96 when the count in the non-volatile counter 46 reaches 1,000. This establishes a maximum count of 999 in the counter.

A flip-flop arrangement in the counter reset 47 is formed by a three input NOR gate 97 and a two input NOR gate 98. The inputs to the gate 97 include the output of the gate 96 and the terminal pin 63P connected to the external reset input conductor line 63. The other input to the gate 97 is coupled to the output of the gate 98. The inputs to the gate 98 include the output of a two input NOR gate 99 and the output of the gate 97 to complete the flip-flop arrangement of the gates 97 and 98. The output of the gate 98 provides the reset logic signal on conductor line output 62 to the non-volatile counter 46. The inputs of the gate 99, in addition to line 63, includes an input from the conductor line 56C connected to the $\overline{IN}$ logic line 56A-2 of the input/shaping circuit 45.

In operation of the counter reset circuit 47, the output of gate 98 on the conductor 62 is normally at the "0" logic state so as to provide an off-return output condition and prevent initiation of reset to the nonvolatile counter 46 if any power outage transitions occur. The gates 97 and 98 are arranged to always come on in this condition, as described further hereinbelow. As a meter initiated pulse 17 occurs to trigger the counter output of one thousand to the base 10 or binary ($1111101000_2$), the sixth input to the gate 96 from the $\bar{Q}$ from the counter stage C10 goes from the "1" state to the "0" state. At this time the other gate inputs will already have reached the "0" state from the "1" state and the output of gate 96 goes to the "1" state. All the inputs to the gate 97 are normally at the "0" state so that "1" output from the gate 96 causes the normally "1" state at the output of the gate 97 to go to the "0" state. The output of the gate 99 is normally at the "0" state so that the output of the gate 98 goes to the "1" state to set the flip-flop providing a pulse at the reset inputs R of each of the counter stages C1 through C10.

The inputs to the gate 99 on conductors 63 and 56C are normally at the "0" state and "1" state, respectively, before reset and, when the $\overline{IN}$ input on conductor 56C goes to the "0" state, with the occurrence of each meter pulse 17 the output of the gate 99 goes to the "1" state. The gate 98 normally remains in the "0" state since the output of gate 97 is normally at the "1" state. However, after reset has been initiated, both inputs to the gate 98 are at the "0" state although the gate 96 output will return to the "0" state after counter 46 resets. The flip-flop of gates 97 and 98 is still in the set condition keeping a "1" state on conductor 62. When the next meter pulse 17 occurs after reset, the output of the gate 99 goes to the "1" state to cause the flip-flop of gates 97 and 98 to internally reset and the output of gate 98 and conductor line 62 to return to the "0" state.

To initiate an external non-volatile counter reset, a signal on line 63 causes the "0" state thereof at the input to the gate 99 to go to the "1" state. The conductor 63 is also connected to provide an input to the gate 97 to thereby trigger the gate 97 output to the "0" state. Since the output of gate 99 remains at the "0" state, the "1" state is provided at the output of the gate 98 causing the counter stages to reset as noted above. The flip-flop formed by the gates 97 and 98 will be internally reset following an external reset logic input by the next change in the $\overline{IN}$ logic on conductor 56A-2 when it goes from the "1" state to the "0" state as also noted hereinabove.

The remaining part of the accumulator section of the metering module 14 including the encoder 48 is now described as shown in the lower portion of FIG. 3. The start control/clock shaping circuit 50 includes a clamping circuit 100 including resistance connected FET transistors 101 and 102 described more fully hereinbelow. The clamping circuit 100 is connected to the terminal pin 24P through the conductor line 24 for receiving a start command logic signal and preventing abnormal voltage surges from damaging the module integrated circuits. The output of the circuit 100 is connected to an inverting circuit 103 having a circuit configuration as shown in FIG. 6. The start command logic input goes from the "0" to the "1" state and is clamped at a predetermined voltage between $-8$ to $-25$ volts by the circuit 102. The inverting circuit 103 output is triggered to the "0" state in response to the start command input.

A variable threshold pulse shaping circuit 104, corresponding to the circuit 82 and shown in detail in FIG. 9, of the input/shaping circuit 45, receives the clock pulse input from the terminal pin 28P associated with the input conductor line 28. The power line frequency of 60 Hz. at the power supply 29 shown in FIG. 1 is used to develop the clock pulse rate at 60 Hz. The clock rate is not limited to 60 Hz and the metering circuit module is capable of accepting clock rates up to 100 kilohertz.

A three input NOR gate 106 is provided in the circuit 50. The inputs to the gate 106 include clock pulses from pulse shaping circuit 104, the inverted start command logic signal from inverting circuit 103, and the output from the readout control counter 52 is provided on the input conductor line 73. The later two inputs to the gate 106 are normally at the "0" state following a start command logic input signal so that the clock pulse signals appearing as "0" logic state pulses at the third input are effective to trigger the normally "0" output state of the gate 106 to the "1" state. Thus, the output of gate 106 provides a clock binary logic signal on conductor line 68-2 and a $\overline{\text{clock}}$ binary logic signal at the output of circuit 107 is connected to the conductor line 68-1. The reset conductor line 74 to counter 52 is also connected to the output of the inverting circuit 103.

Prior to a start command logic input signal, the logic state on the conductor line 24 is at the "0" state so that the $\overline{\text{clock}}$ logic on conductor 68-1 is at the "1" state, the clock logic on conductor 68-2 is at the "0" state, and, accordingly, reset conductor 74 is at the "1" state. The output of the gate 106 is at the normally "0" state and the readout control counter 52 is in the reset state.

A two input NOR gate 108 has an output which provides the inhibit signal on the conductor line 69 to the input/shaping circuit 45. Inputs to the gate 108 include the output of the inverting circuit 103 and the conductor line 73 normally having the "1" and "0" states, respectively. Accordingly, the binary logic inhibit signal is provided on the conductor line 69 from the output of the gate 108 is in the "1" state.

In operation of the start control/clock shaping circuit 50, the start command signal goes from the "0" to the "1" state to initially remove the "1" state providing the control counter reset signal on the conductor 74 to the readout control counter 52 and produce the "1" state inhibit logic on line 69. The next positive going clock pulse, i.e., "1" to "0" starts the clock and $\overline{\text{clock}}$ logic signals on the conductor lines 68–2 and 68–1 to provide IN and $\overline{\text{IN}}$ counting inputs to the readout control counter 52. In a manner described further hereinbelow, the "0" state of the conductor line 73 from the gate 110 of the readout control counter 52 goes low to the "1" state after a count of 31 clock pulses, which terminates the data readout cycle. The output of the gate 108 goes to the "0" state and terminates the inhibit logic signal.

Referring now to the readout control counter 52 in FIG. 3, there are five counter stages A, B, C, D and E providing $2^0$ through $2^4$ binary counting outputs each having a modified form of the non-volatile counter stages as shown in FIG. 4 because of not having a memory storage section. Accordingly, each stage has IN and $\overline{\text{IN}}$ inputs associated with the left-hand side of the blocks representing each of the stages A through E. The clock and $\overline{\text{clock}}$ logic signals inputs are applied to the IN and $\overline{\text{IN}}$ logic inputs of stage A. The right-hand side of each block representing a counter stage includes logic outputs Q and $\overline{\text{Q}}$ outputs of the preceding stages. Only the $\overline{\text{Q}}$ output of the counter stage E is used as described further hereinbelow. The reset input R of each stage is at the bottom of each block and is connected to the conductor line 73 from the circuit 50 to be triggered to the reset condition in response to the "1" state applied thereto.

The Q and $\overline{\text{Q}}$ outputs of the stages A, B, C and D are also connected by conductor lines 72–1 and 72–2, and 72–3 and 72–4, 72–5 and 72–6, 72–7 and 72–8, respectively, to the encoder 48 for sequential sampling and serial readout of the binary encoded data work provided therein. The $\overline{\text{Q}}$ output of the counter stage E is connected to the conductor line outputs 70 and 70A.

The five input NOR gate 110 has each of its inputs connected to the $\overline{\text{Q}}$ outputs of the counter stages A, B, C, D and E. Each of these $\overline{\text{Q}}$ outputs is normally in the "1" state and goes to the "0" state with the counting of the stage so that the output of the gate 110 is normally in the "0" state as noted hereinabove. Each $\overline{\text{Q}}$ output goes to the "0" state as the succeeding counter stages reach the stage count so that at the thirty-first clock pulse the $\overline{\text{Q}}$ output of the state E goes to the "0" state to cause the output of gate 110 to go to the "1" state.

For initiating the start-next-readout signal on the conductor 42 of the circuit 52 the two input NOR gate 111 and the flip-flop connected to two input NOR gates 112 and 113 are provided in the readout control counter 52. The $\overline{\text{Q}}$ outputs of the stages A and E are connected to the inputs of the gate 111. The output of gate 111 is normally in the "0" state and is connected to one of the inputs of the gate 113. The other input of the gate 113 is cross coupled to the output of the gate 112 and the output of the gate 113 is cross-coupled to one of the inputs to the gate 112 to complete a flip-flop arrangement. The remaining input to the gate 112 is connected to the $\overline{\text{Q}}$ output of the counter stage E. The output of the gate 112 is connected to the conductor line 42 output and terminal pin 42P and is normally in the "0" state to produce the start-next-readout logic signal by going to the "1" state. Accordingly, the output of the gate 113 is normally in the "1" state. This causes the output of the gate 112 to initiate a start next readout logic signal when the seventeenth clock logic signal is counted in the readout control counter 52.

At the end of the sixteenth and beginning of the seventeenth clock logic count the $\overline{\text{Q}}$ of counter stage E goes from the "1" to the "0" state and the $\overline{\text{Q}}$ of the A stage goes from the "1" to the "0" state to set the gate 111 so that its output goes to the "1" state. This resets the gate 113 to the "0" state so that both inputs to the gate 112 are both at the "0" state since the $\overline{\text{Q}}$ of the E counter stage went to the "0" state at the sixteenth clock logic count. This sets the gate 112 so that the binary logic state on line 42 goes to the "1" state to initiate the start next readout logic signal. Following the seventeenth clock logic count the gate 111 resets, however, the $\overline{\text{Q}}$ of the counter stage E at input to gate 112 remains in the "0" state disabling the gate 113 and thereafter maintaining the "1" state and the start-next readout signal on the conductor line 42. When the thirty-first clock logic is counted the $\overline{\text{Q}}$ of the stage A provides a "0" state at the input to the gate 110 and since the other inputs are already at the "0" state the output of the gate 110 goes to the "1" state and this is connected by the conductor line 73 to disable the gate 106 to prevent it from producing further clock and $\overline{\text{clock}}$ logic pulses on the lines 68–2 and 68–1 and terminates the inhibit logic signal developed by the output of the gate 108.

Referring now to the parity calculator 53, there are included a two input NOR gate 114 an inverting circuit 115 and a trigger flip-flop circuit 116 including the circuit of the counter stages A–E of the readout control counter 52. The circuit 116 includes IN and $\overline{\text{IN}}$ logic inputs, Q logic output and a reset input R. The conductor lines 67 and 68A apply $\overline{\text{data out}}$ and $\overline{\text{clock}}$ logic signals respectively to the input of the gate 114. The output of the gate 114 is connected directly to the IN input of the counter stage 116 and also to the inverting circuit 115 which has an output connected to the $\overline{\text{IN}}$ input to the circuit 116. The reset input R of the circuit 116 is connected to the $\overline{\text{Q}}$ output of the counter stage E by the conductor line 70A. The Q logic output of the circuit 116 is connected to the conductor line 65 to the parity input P of the encoder 48.

In operation, the $\overline{\text{Q}}$ output of stage E at the reset input R holds the circuit 116 in the reset condition during the programmed readout delay interval following a start command signal. When data word readout is started, $\overline{\text{Q}}$ output of the counter stage E goes to the "0" state at the sixteenth CLOCK logic signal and this concurrently releases the circuit 116 from the reset condition. At each instance that there is a "1" state in the data bit positions of the data word readout from the encoder 48 the $\overline{\text{DATA OUT}}$ logic signal on the conductor line 67 goes to the "0" state, when concurrently the CLOCK logic goes to the "0" state, which occurs once during each bit position of the data word, an output of the gate 114 occurs. Each output from gate 114 triggers the counter stage 116 between the bistable states thereof and the Q output is placed at alternate "1" and "0" states in response to the sequential occurrence of each "1" state data bit in data word readout. As noted hereinabove, the parity bit P is next to the end bit E in the data word. If an odd number of "1" bits have been read out prior to the parity bit P position, the Q output of the circuit 116 will be in the "1" state and vice versa the Q output will be in the "0" state if an even number of "1" data bits precede the parity bit P. Since the end data bit E is always in the "0" state the parity calculator 53 assures that there is an even number of "1" state data bits read out in the complete data word format.

Figure 5:
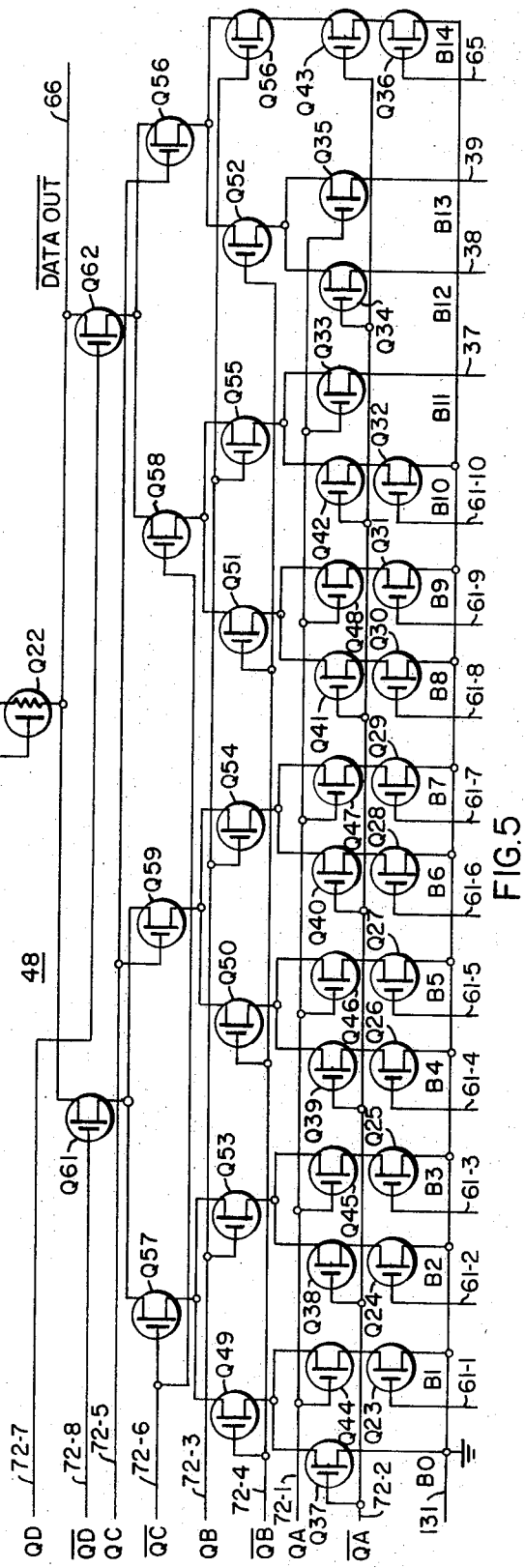
FIG. 5 is a schematic circuit diagram of the parallel to serial converter and encoder circuit shown in FIGS. 2 and 3.

Referring now to the encoder 48, the detail circuit thereof is shown in FIG. 5 and is described in detail hereinbelow. The conductor lines 72–1 and 72–2 through 72–7 and 72–8 connect the Q and $\overline{Q}$ logic outputs from the counter stages A through D of the readout control counter 52 to the sampling logic inputs to the 15 data bit position sampling branch circuits therein. These branch circuits are enabled sequentially starting with first CLOCK logic count and at the sixteenth CLOCK logic count. However, the $\overline{Q}$ output of the counter stage E on line 70 does not enable the output buffer 54 until the sixteenth CLOCK logic is counted to initiate the data word readout from the encoder 48 on the conductor line 69. The first 15 CLOCK Pulses occur during the programmed readout delay period. The 10 logic inputs on conductors 61–1 through 61–10 from the non-volatile counter 46, the three meter identification logic inputs on the conductor lines 37, 38 and 39, and the parity logic input on conductor line 65 are each associated with a data bit position branch circuit of the encoder 48. The start data word bit S input is programmed internally at one of the branch circuits of the encoder 48 and the end data word bit E is provided without an external input to the encoder 48 as will be understood from the description of FIG. 5.

The operation of the encoder 48 is provided by the sequential enabling of one of the branch circuits in the encoder circuit to sample it. If a "1" state or "0" state is at the data logic inputs the enabled encoder branch circuit provides an inverse, i.e., "0" to "1" state, respectively, so that a $\overline{DATA\ OUT}$ logic occurs on output line 66 of the encoder 48.

The output buffer circuit 54 includes two, two input NOR gate circuits 117 and 118 and an inverting circuit 119. The inputs to the gate 117 include the encoder output conductor 66 and $\overline{Q}$ output of the counter stage E on conductor 70. The output of the gate 117 provides one of the inputs to the gate 118 and the other input is from the DATA IN logic input conductor line 43 connected to the terminal pin 43P. This external connection receives the DATA OUT logic from a following cascade connected metering module such as at output 22A of the metering module 14A as shown in FIG. 1. The output of the gate 118 is connected to the input of the inverting circuit 119. The output of the circuit 119 provides the DATA OUT logic on conductor line 22 as it goes to the "1" state and the terminal pin 22P of the metering module 14. The DATA OUT logic signals on conductor line 22 provide the data word readout to the data set 20 if the metering module 14 is used singly or if in the position of a first metering module, as shown in FIG. 1, serving as the first of a series of cascade connected metering chips. If the metering module 14 is connected as the metering modules 14A and 14N are shown in the remote metering system 13 of FIG. 1 then the terminal pin 22P is connected to the DATA IN terminal pin 43 of a preceding module. The inverting circuit 119 provides the DATA OUT logic output on the conductor line 22 in an inverse logic state from the state of each data word bit provided on the line 66 and has the 16 bit data word format noted above.

In operation of the output buffer 54, a DATA OUT logic readout occurs from the encoder 48 starting at the sixteenth CLOCK logic pulse when the $\overline{Q}$ output of the counter stage $\overline{E}$ of readout control counter 52 goes to the "0" state. Upon the state of the $\overline{DATA\ OUT}$ logic from the encoder 48 going to the "0" state the output of the gate 117 goes to the "1" state. The conductor line 43 is normally in the "0" state so that the output of the gate 118 goes to the "1" and to the "0" when the reverse states, respectively, occur in the logic output of the gate 117. Accordingly, the $\overline{DATA\ OUT}$ inverse logic signals are developed at the input to the inverting circuit 119 and on the line 67 connected at an input of the parity calculator 53. The true states of data word bits or DATA OUT logic signals are applied at the inputs to the encoder 48 and then are developed at the output of the inverting circuit 119 and at the DATA OUT terminal pin 22P. Upon reaching the thirty-first clock pulse signal, the end data word bit E is at the "1" state at the $\overline{DATA\ OUT}$ output of the encoder 48 to produce a "0" state at the thirty second data word bit position.

Since the CLOCK logic inputs to the readout control counter 52 are stopped at the thirty-first CLOCK logic count, the "1" state on line 66 and the "0" state on lines 70 at the inputs to the gate 117 remain. This enables the other input to the gate 118 which is connected to the DATA OUT logic output of the following metering module at the terminal pin 43P. The DATA OUT logic of the following metering module occurs at the thirty-second clock pulse following the readout cycle of the preceding metering module. Accordingly, a synchronizing or start data bit S of the following metering module occurs by going from the "0" state to the "1" state at the terminal pin 43P. This causes the output of the gate 118 to go from the "1" state to the "0" state. The next data word synchronizing bit S is produced at the output of the inverting circuit 119 and terminal pin 22P as a "1" state the same as it is applied to the terminal pin 43P. In a similar manner the subsequent data word bits pass through the output buffer 54 from the terminal pin 43P to the terminal pin 22P.

Referring now to the circuits illustrated in FIGS. 4, 5, 6, 7, 8 and 9 which are included in the metering module 14 and form the logic block circuit elements shown in the schematic diagram of FIG. 3. As previously noted these circuits are formed on a single N-type semiconductor wafer such as N-type silicon and the circuit elements formed thereon are field effect transistors (FET) type devices having an insulated gate providing a p-channel metal-nitride-oxide semiconductor (MNOS). These devices are further characterized as operating in the enhancement mode.

In FIG. 4 the stage C1 of the non-volatile counter circuit 46 is shown as being exemplary of the ten stages C1 through C10 utilized therein. The counter stage is an integrated non-complementing counter with memory capable of being fabricated by a single diffusion step. The memory section of each stage includes two non-volatile memory elements including FET transistors QM1 and QM2 which are made as described in U.S. Pat. application Ser. No. 219,463 filed Jan. 20, 1972 and assigned to the assignee of this invention. These memory elements have an insulating layer and a layer of silicon nitride having controlled thickness to provide selective storage of charge carriers in response to large oppositely poled polarizing voltages. This establishes either of depletion or enhancement type characteristics which are maintained following removal of the polarizing voltages since the stored charged carriers are trapped within the layers and retain the associated memory element characteristic for periods from one to several months.

The remaining FET devices included in the counter stage C1 and in the circuits illustrated in FIGS. 5 through 9 are of the general MNOS transistor construction without the memory characteristic as included in the memory transistors QM1 and QM2. Two transistors Q1 and Q2 FIG. 4 are connected in a flip-flop circuit configuration to form the counting logic elements of the counter stage C1. The conductive and non-conductive states of transistors Q1 and Q2 establish the "0" and "1" states respectively at the Q and $\overline{Q}$ outputs.

In the counter stage C1, the supply conductors 121 and 122 are connected to the source of voltage VDD and ground, respectively, connected to the metering module at terminal pins 27P and 76P. The memory section includes resistance connected transistor load elements Q3 and Q4 each having the gate and drain connected together and a geometrical configuration to provide a resistance-like load element. The source to drain circuits of the transistors Q3 and Q4 connect the drains of the memory transistors QM1 and QM2, respectively, and in series with the supply conductor 121. The source of the transistor QM1 is connected to a conductor 123 connected to the Q logic output and the drain of the transistor Q1. Similarly, the source of the transistor QM2 is connected to a conductor 124 connected to the $\overline{Q}$ logic output and the drain of the transistor Q2. A conductor 125 connects the memory input M to both gates of the transistors QM1 and QM2. Transistors Q5 and Q6 are connected and have a geometrical configuration to form resistance load element similar to the transistors Q3 and Q4 and are connected in parallel with the series connections of transistors Q3 and QM1 and transistors Q4 and QM2, respectively. The impedances of transistors Q5 and Q6 is sufficiently high to provide a parallel load for the memory transistors QM1 and QM2 and prevent changes in the conductive and non-conductive states of the logic transistors Q1 and Q2 when a memory clear signal level is applied to the conductor 125. Thus, the transistors Q5 and Q6 are referred to as "keeper" load elements.

Referring now further to the counting logic section of the counter stage C1, the flip-flop transistors Q1 and Q2 have their source to drain circuits connected in series with the source to drain circuits of the memory transistors QM1 and QM2, respectively. These connections are made such that the source to drain circuit of the transistor Q1 is connected between the Q output conductor 123 and the grounded conductor 122 and the source to drain circuit of the transistor Q2 is connected between the $\overline{Q}$ output, conductor 124 and the grounded conductor 122. The drain of each of the transistors Q1 and Q2 is cross-coupled to the gate of the other transistor to form the flip-flop circuit configuration.

The IN and $\overline{IN}$ counting logic inputs are connected to the conductors 126 and 127, respectively. The transistors Q7, Q8, Q9, Q10, Q11 and Q12 are associated with the input to the flip-flop transistor Q2 to provide the proper input pulse steering thereto. The source to drain circuits of the transistors Q7 and Q8 are connected in series between the Q output conductor 123 and the grounded conductor 122. The gate of the transistor Q7 is connected to the $\overline{IN}$ input conductor 127. Stray circuit capacitance C1 is developed at the gate of the transistor Q8 forming a critical storage mode, and ground. The gate of the transistor Q8 is connected through the source to drain circuit of the transistor Q9, which has the drain connected to the gate to form a resistance load element, to the VDD conductor 121. The gate of the flip-flop transistor Q1 is connected to the gate of the transistor Q11. The drain to source circuit of the transistor Q11 is connected in series with the source to drain circuit of the transistor Q12 with the drain of the transistor Q12 connected to the conductor 126 and with the source of the transistor Q11 connected to the conductor 122. The gate of the transistor Q12 is connected to the conductor 123. The source to drain circuit of the transistor Q10 is between the commonly connected drain and source of the transistors Q11 and Q12 and the drain of the transistor Q9. The gate of the transistor Q10 is connected to the conductor 126.

The transistors Q13, Q14, Q15, Q16, Q17, Q18, correspond to the teansistors Q7, Q8, Q9, Q10, Q11 and Q12, respectively, and are connected in a corresponding manner as illustrated in FIG. 4 for steering the pulse input to the flip-flop transistor Q1. These corresponding connections are made to each other, the conductors 122, 124, 126 and the gate of the flip-flop transistor Q2. Stray circuit capacitance C2 corresponding to the stray capacitance C1, is connected across the gate of the transistor Q14, which forms the other critical internal storage mode.

The reset input R is connected to a conductor 128. A reset transistor Q19 has its source to drain circuit connected across the conductors 122 and 123, the latter conductor being connected with the gate of the transistor Q2. The gate of the transistor Q19 is connected to the reset input conductor 128. Transistors Q20 and Q21 include source to drain circuits connected across the capacitance C1 and C2, respectively. The gates of the transistors are connected to the reset conductor 128.

In operation of the counter stage C1, assuming the Q and $\overline{Q}$ outputs at the "1" and "0" states, respectively, so that the flip-flop transistors Q1 and Q2 are non-conductive and conductive, respectively. If the IN and $\overline{IN}$ inputs go from the "1" to "0" logic states and from the "0" and "1" logic states, respectively, the conductor 125 goes to approximately zero volts and the conductor 127 goes to approximately −25 volts. This renders transistors Q12 and Q10 both conductive from the non-conductive state, the transistor Q9 always being conductive so that the stray capacitance C1 beings charging to the negative voltage on the conductor 121. The negative voltage on the $\overline{IN}$ input conductor 127 renders the transistor Q7 conductive as the charging of the capacitor C1 renders the transistor Q8 conductive. The transistors Q18, Q13 and Q21 will be rendered nonconductive. The conducting transistors Q7 and Q8 forces the negative voltage "1" state at the Q output conductor 123 to approximately ground or zero voltage of the conductor 122. This causes the conducting flip-flop transistor Q2 to be biased non-conducting causing the $\overline{Q}$ output to go from the "0" to the "1" states and establish a negative voltage on the conductor 124. This maintains a bias at the gate of the flip-flop transistor Q1 to render it conductive from the non-conductive state. The conducting transistor Q1 causes the Q output conductor 123 to be held in the "0" state approximately at the voltage of the grounded conductor 122. The stray capacitance C1 then discharges through transistor Q8 to conductor 122.

The memory transistors QM1 and QM2 are conditioned at different threshold levels which are retained when power is removed from their biasing circuits to assure that the flip-flop transistors Q1 and Q2 return to the same conductive state following a power outage as existed prior to the power outage. This is accomplished by establishing, for example, low and high thresholds in the enhancement mode in the memory transistors QM1 and QM2. In the initial condition described hereinabove for the operation of the flip-flop transistors Q1 and Q2, the Q and $\overline{Q}$ output conductors were in the "1" and "0" states, respectively. Correspondingly, the transistor Q1 is non-conductive and the transistor Q2 is conductive. The memory transistor QM1 will be in a corresponding low threshold state, for example minus three volts gate to source, and the memory transistor QM2 will be in the high threshold state, for example, minus eight volts gate to source. This provides the hysteresis memory characteristic in which the memory transistors are switched conductive when the threshold level is reached.

When power outage occurs, the bias on the flip-flop transistors Q1 and Q2 is removed but the threshold levels of the memory transistors QM1 and QM2 remains due to the distribution of internally stored carriers following application of polarizing voltages. When power returns, the normally negative voltage level of the memory input conductor line 125 triggers the memory transistor QM1 conductive first since it is at the lower threshold level. The low source to drain conductive state of the memory transistor QM1 applies a negative voltage bias from the conductor 121 to the gate of the flip-flop transistor Q2 returning it to the original conductive state. After the memory transistor QM1 is switched conductive and prior to the threshold of the memory transistor QM2 being reached, since the conductor 125 returns to a voltage more negative than the higher threshold level, there is no switching bias applied to the gate of the transistor Q1 and concurrently the source of the conducting transistor Q2 is pulled to ground potential so as to establish and hold the transistor Q1 and the original non-conducting state which it had prior to the power outage. Accordingly, the original "1" and "0" states are reestablished at the Q and $\overline{Q}$ outputs.

When the IN and $\overline{IN}$ inputs have been counted into the counter stage C1 by triggering the flip-flop transistor Q1 and Q2, as described above, the memory clear/write pulse VM is applied after the short delay for counter rippling. This is to erase and set the memory transistors QM1 and QM2 to logic states corresponding to the new count indicated by the new conductive states of the flip-flop transistors Q1 and Q2. To correspond to the operation described above, the transistors Q1 and Q2 are taken as having been just immediately triggered to conductive and nonconductive states from non-conductive and conductive states, respectively. The memory clear/write pulse VM has a first and high positive polarizing voltage level reaching +25 volts, for example, to provide the memory clear. The positive voltage level 59 establishes the low threshold state in the memory transistor QM2 from its previously high threshold state as both the memory transistors QM1 and QM2 are set to the low threshold level by the polarizing effect of the voltage level 59. It is typically required to maintain this memory clear voltage level for 10 to 20 microseconds to preserve the memory for a substantial time.

As the second and low negative polarizing voltage level 60 of the memory clear/write pulse VM is reached, −25 volts for example, the memory write or store is provided. This negative voltage level 60 of the pulse VM establishes the high threshold state in the memory transistor having its drain connected to the Q or $\overline{Q}$ output which is at the substantially zero voltage level or "0" logic state. Since the new state of the Q output conductor 123 is at the "0" state, the memory transistor QM1 enters the high threshold state. The memory transistor QM2 remains at the low threshold state since its drain is already at the −25 volts level. The level 60 of −25 volts at the gate produces no effective polarization in the transistor QM2. These threshold levels are effective to return the flip-flop transistors Q1 and Q2 to the corresponding conductive and non-conductive states as described hereinbefore for the reverse flip-flop logic state. The memory transistors QM1 and QM2 are capable of retaining the threshold levels for periods in access of one month.

When a reset logic signal is applied to the conductor line 128, the "1" state negative voltage appears at the gates of the transistors Q19, Q20 and Q21 to render them conductive. The transistors Q20 and Q21 short circuit capacitors C1 and C2 to discharge them. This also draws the level of the Q output conductor 123 to the level of the grounded conductor 122 through the source to drain circuit of the transistor Q19 and establishes the "0" logic state at conductor 123 if it is not already at "0" state. If the conductor 123 is at the "1" state and the conductor 124 is at the "0" state, the flip-flop transistor Q2 is switched non-conductive thereby lowering the voltage level at its drain. This switches the transistor Q1 conductive to establish the reset logic states at the Q and $\overline{Q}$ outputs of the counter stage C1.

If the counter stage C1 is already at the reset logic state there will be no change in the threshold states of the memory transistors. When the counter stage C1 is in the opposite or "set" logic state and the reset signal is applied, the memory transistor QM1 enters the high threshold state along with the transistor QM2 since the Q output conductor 123 goes from the "1" state level to the "0" state level placing its source substantially at the zero volts level so that the appropriate polarizing voltage is developed by the negative voltage normally existing at the memory input conductor 125. The memory transistors QM1 AND QM2 will be set to store the appropriate logic state following the next meter initiated pulse 17 and setting of the corresponding logic state in the counter stage C1.

Referring now to the circuit of the encoder 48 as illustrated in FIG. 5, it is formed by a three matrix circuit configuration. Each of the transistors are p-channel MNOS FET transistor devices as described hereinabove. A conductor 130 is connected to the VDD power supply voltage level of −25 volts supplied to the metering module 14. A conductor 131 is connected to the ground potential source, as indicated, of the metering module 14. A transistor Q22 is connected as an active resistance load element having commonly connected drain and gate and an appropriate geometrical configuration and the source to drain circuit thereof connected across the conductor 130 and the conductor 66 as illustrated in FIG. 3 the conductor line 66 provides the $\overline{\text{DATA OUT}}$ logic output forming the data word readout signal of the encoder 48. The transistors illustrated between the conductor 66 and the grounded conductor 131 form 15 data branches corresponding to the data bit positions B0 through B14 illustrated in FIG. 2. The data input transistors Q23, Q24, Q25, Q26, Q27, Q28, Q29, Q30, Q31, Q32, Q33, Q34, Q35, and Q36 are included in the branches designated B0, B1, B2, B3, B4, B5, B6, B7, B8, B9, B10, B11, B12, B13 and B14, respectively, with the source of each except the transistors Q33, Q34 and Q35 connected to the conductor 131.

The Q logic outputs from the non-volatile counter stages C1 through C10 are applied through the conductor lines 61–1 through 61–10 to the gates of the transistors Q23 through Q32, respectively as shown. These provide the binary logic of the meter count in parallel relationship. The three conductor lines 37, 38 and 39 carrying the meter identification data logic ID1, ID2, ID3 are connected to the source of each of the transistors Q33, Q34 and Q35, respectively. The parity data logic P on the conductor line 65 is connected to the gate of the transistor Q36.

The readout control counter 52 provides Q and $\overline{Q}$ logic outputs of the counter stages A, B, C and D on the conductor lines 72–1 and 72–2 through 72–7 and 72–8 shown in FIG. 3 and are also designated correspondingly QA, $\overline{QA}$, QB, $\overline{QB}$, QC, $\overline{QC}$, QD and $\overline{QD}$ in FIG. 5 as they are connected to the remaining transistors of the encoder 48 as described hereinafter. This provides the sampling inputs to the encoder 48 to provide the serial readout with the progressive count of the counter 52. Transistors Q37, Q38, Q39, Q40, Q41, Q42, the transistor Q34 and a transistor Q43 included in the second row of the encoder matrix and having the source to drain circuits thereof connected in series with the branches B0, B2, B4, B6, B8, B10, B12 and B14 have the gates thereof connected to the conductor $\overline{QA}$. Transistors Q44, Q45, Q46, Q47, Q48 and the transistors Q33 and Q35 complete the second row and have source to drain circuits connected in series with the branches B1, B3, B5, B7, B9, B11 and B13 and the gates thereof connected to the conductor QA.

The transistors Q49, Q50, Q51 and Q52 included in the third row of the encoder matrix have the source to drain circuits thereof connected in series with the pairs of branches B0 and B1, B4 and B5, B8 and B9, and B12 and B13 with the gates connected to the conductor $\overline{QB}$. The transistors Q53, Q54, Q55 and Q56 complete the third row and have the source to drain circuits thereof connected in series to the pairs of branches B2 and B3, B6 and B7, B10 and B11, and B14, respectively, with the gates of each connected to the conductor QB. The transistors Q57 and Q58 are included in the fourth row of the encoder matrix and have the source to drain circuits thereof connected in series with the pair of transistors Q49 and Q53 and Q51 and Q55, respectively, with the gates connected to the conductor $\overline{QC}$.

The transistors Q59 and Q60 complete the fourth row and have the source to drain circuits thereof connected in series with the pairs of transistors Q50 and Q54 and Q52 and Q56, respectively, and the gates thereof are connected to the conductor QC.

The encoder matrix is completed by a fifth row including the transistors Q61 and Q62. The source to drain circuit of the transistor Q61 is connected in series between the transistor Q22 and the source to drain circuits of the transistors Q57 and Q59 with the gate thereof connected to the conductor QD. The transistor Q62 has a source to drain circuit connected between the transistor Q22 and the source to drain circuits of the transistors Q58 and Q60 with the gate thereof is connected to the conductor $\overline{QD}$.

It is noted that the encoder matrix does not have a branch associated with the data word bit position B15 indicated as being a functional input to the encoder 48 in FIG. 2. The encoder 48 provides the VDD voltage on the conductor line 66 when the time interval for the bit position B15 occurs since each of the branches of the matrix associated with the data bits B0 and B14 will be open circuited at this time interval and the transistor load element Q22 is connected so as to be always conductive.

In operation of the encoder 48, the branches associated with the data word bit positions B0 through B14 are sequentially enabled to sample the branches of the readout control counter 52 at a rate controlled by the CLOCK logic signals applied through the conductor lines 68–1 and 68–2 shown in FIG. 3. For example, Q logic outputs of the readout counter stages A, B, C and D will all be in the "1" state at the time interval for the first or START data word bit position B0. This renders the transistors Q37, Q49, Q57 and Q61 conductive causing the conductor 66 to be substantially at the ground potential of the conductor 131 and at the "0" logic state. The inverting operation of the output buffer 54 will develop the "1" logic state at the data out terminal 22P of the metering chip circuit 14 as shown in FIG. 3.

The branches associated with the data word bit positions B1 through B10 are sequentially enabled as the readout counter stages A, B, C and D are triggered by the CLOCK logic signals. The Q outputs of stages C1 through C10 of the non-volatile counter 46 on the conductor lines 61–1 through 61–10, respectively, are in the "1" or "0" logic states corresponding to the accumulated meter count so the associated branches of the encoder 48 are rendered conductive or nonconductive, respectively, by biasing the transistors Q23 through 32 to conduction or non-conduction to correspondingly establish the inverted "0" to "1" logic states, respectively, on the conductor line 66.

The branches associated with the data word bit positions B11, B12 and B13 have the source to drain circuits of the transistors Q33, Q34 and Q35 externally connected to ground or left open circuited at the metering chip terminal pins 37P, 38P and 39P. This provides the three meter number identification logics in the data word bit positions B11, B12 and B13. If, for example, the transistor Q34 is connected to ground at terminal 38P, as shown in FIG. 3, and the transistors Q33 and Q35 are left disconnected at the terminals 37P and 39P, the conductor 66 will be brought to the "1," "0," and "1" logic states during the time intervals for the B11, B12 and B13 data word bit positions, respectively.

The transistor Q36 in the branch associated with the data word position B14 will be rendered conductive by the parity calculator 53 if the logic states of the previous data bits B0 through B13 have had an odd number of "1" logic states occurrences during the time intervals for the B0 through B13 data word bit positions. This provides the "0" logic state at the conductor line 66. If there are already an even number of "1" logic state inputs the transistor Q36 will remain nonconductive and the conductor line 66 will be at the "1" logic state.

Accordingly, the logic state at the data out terminal pin 22P will be at the "1" or "0" logic states when the logic state of the conductor 66 is at the "1" or "0" logic states, respectively. Finally, as noted above, at the final data word bit position B15 the logic state "1" is always present on the conductor 66 since all branches of the encoder 48 are nonconductive and a "0" logic state is provided at the data out output terminal pin 22P.

Referring now to the remaining circuit portions included in the circuit blocks of FIG. 3, the clamping circuit 100 includes the two transistor resistance connected load elements 101 and 102 noted above which have established threshold turn-on levels. The voltage on conductor line 24, which is connected to the transmission line system in the case of the first metering module 14, may experience large voltage variations in the order of 25 to 100 volts which is excessive for the metering module circuitry. The resistance connected transistors 101 and 102 have a threshold voltage in the order of 4 to 5 volts. As the voltage on the conductor line 24 exceeds the combined threshold voltages of the transistors 101 and 102, the voltages across each is maintained at its threshold voltage. Accordingly, the voltage at the output of the clamping circuit 100, at the input to the inverting circuit 103 is clamped to a voltage in the order of −8 to −10 volts.

Referring now further to the circuits utilized in the metering module 14, an inverting circuit is illustrated in FIG. 6 as included in the circuit blocks 87, 91, 107, 115 and 119. A transistor resistance connected load element Q63 and an FET transistor Q64 comprise the inverting circuit. The gate and drain of the load element Q63 are connected together and the drain to source circuit is connected in series to a conductor 135 connected in common with voltage source VDD. The source to drain circuit of the transistor Q64 is connected in series with transistor Q63 and a conductor 136 connected in common with the circuit ground. The conductor 137 at the gate electrode of the transistor Q64 defines the input of the inverter circuit and the conductor 138 at the source, also connected to the transistor Q63 defines the output. A "1" logic state biases the transistor Q64 conductive and, since the transistor Q63 provides a high resistance impedance, the "0" logic state is developed at the output of the inverting circuit. Conversely, a logic state "0" signal renders the transistor Q64 non-conductive and a logic state "1" is developed at the output.

In FIGS. 7 and 8 are illustrated two exemplary NOR gate circuit configurations providing the NOR logic gating and flip-flop circuit operations in FIG. 3. In FIG. 7, a five input NOR gate is illustrated as used in the gate 110 and in FIG. 8 a two input gate as used in the two flip-flop connected gates 86 and 98 which are modified to prejudice the associated flip-flop in which they are connected to return to desired state upon initial energization.

In FIG. 8 a resistance connected transistor load element Q65 and a second resistance connected transistor Q66 have the source to drain circuits in series with a conductor 140 which is connected to the voltage source VDD. The source to drain circuits of transistors Q67 and Q68 are connected in parallel and the parallel combination is connected in series with the transistor Q66 and the conductor 141 which is connected to both the circuit ground and the transistor Q67. The gate electrodes of the transistors Q67 and Q68 define the two gate inputs and the common sources define the output so that when the inputs are both at the "0" logic state the output is at the "1" logic state since both transistors are non-conductive. When either or both of the inputs are at the "1" logic state the output is at the "0" state since the transistor Q66 is added to provide an additional voltage drop so that when the gates 85 and 98 are cross-coupled to the gates 86 and 87, respectively, a "0" state will always be established at the outputs of the gates 85 and 98 upon return of power after a power outage. The remaining gate circuits are similar to the circuit shown in FIG. 8 but without the additional resistance connected transistor Q66.

In FIG. 7, for example, five transistors Q69, Q70, Q71, Q72 and Q73 provide the corresponding number of inputs at the gates thereof and are connected with source to drain circuits in parallel. A resistance connected transistor load element Q74 connects the common source connections to a conductor 142 connected with the voltage source VDD and the common drain connection is connected to a conductor 143 connected to the circuit ground. The common source connections provide the gate circuit output. The "0" logic state at all the inputs provides the output at the "1" logic state and when any of the inputs are at the "1" logic state the output is placed at the "0" logic state. Accordingly, each of the remaining gate circuits are connected as described for the circuit in FIG. 7 with the number of input transistors used corresponding to the required NOR gate inputs.

In FIG. 9 is illustrated the pulse shaping circuit utilized in circuits 82 and 104 to produce an output signal in response to an input signal. The circuit operates in Schmitt trigger-like manner and has a variable threshold for initiating a second bistable state upon an input signal reaching a first level and returning below a second level different from the first level. This produces a square wave pulse of a constant amplitude.

Two resistance connected transistor load elements Q75 and Q76 are each connected to common conductor 145 connected to the voltage source VDD. An input transistor Q77 has the drain to source circuit connected in series with the transistor load element Q75. The drain of transistor Q77 is connected to the circuit output conductor 146. The gate of the transistor Q77 is connected to the input conductor 147. A transistor Q78 is connected in series with the element Q76 and the sources of the transistors Q77 and Q78. These common sources are connected together and in series with a transistor Q79 to a conductor 148 connected to the common ground. The gate of transistor Q79 is connected to the drain of the transistor Q78.

In operation of the pulse shaping circuit, a zero voltage on conductor 147 biases the transistor Q77 to non-conduction, the transistor Q78 to conduction, and the transistor Q79 in an intermediate conductive state. The threshold voltage of Q79 is maintained at the sources of the transistors Q77 and Q78. The transistor Q78 will attempt to go into harder conduction thereby limiting the gate biasing of the transistor Q79 and preventing a more conductive state. As an input pulse at the gate of the transistor Q77 goes from essentially zero volts to a negative voltage, the transistor Q77 will be biased conductive when the level of the voltage on conductor 147 reaches the combined threshold voltages of the transistor Q77 and the transistor Q79. Since all the transistors are substantially identical, in one embodiment the threshold voltage may be about 4 to 5 volts negative, thus approximately −10 volts causes the transistor Q77 to start conduction.

The drain of transistor Q77 goes more negative toward the voltage of the conductor 145, less the voltage across the transistor load element Q76, to bias transistor Q78 to non-conduction. This biases the transistor Q79 toward full conduction. The source of the transistor Q77 goes to the ground reference voltage of the conductor 148 causing a regenerative biasing of the transistor Q77 to conduction. Since the threshold voltage of the transistor Q79 is removed from the threshold required across input conductors 146 and 148, only an input voltage of 4 to 5 volts which is equal to the threshold of Q77 is needed at its gate to maintain conduction. The regenerative action of bringing the source of the transistor 77 to zero volts or ground produces a fast switching time for effecting the nonconductive to conductive states for the transistor Q77 and producing the second bistable state of the circuit. This drives the output conductor 146 from a negative voltage level or the "1" logic state to essentially the zero voltage level or the "0" logic. An output voltage pulse is produced having a sharp leading edge. The voltage pulse level is maintained on the conductor 146 so long as the voltage at the gate of the transistor Q77 exceeds its threshold voltage of −4 to 5 volts.

When an input pulse to the gate of the transistor Q77 begins to become more positive and return to zero volts, its threshold voltage is reached and it switches toward the non-conductive state. The regenerative action of the circuit starts to drive the transistor Q78 toward full condition as the drain of the transistor Q77 goes toward voltage of the conductor 145. This reduces the level of bias voltage at the gate of the transistor Q79 so it becomes less conductive to bring its drain to a more negative voltage and further tending to drive the transistor Q77 to the non-conductive state. This reestablishes the threshold voltage of the transistor Q79 at the source of transistor Q77 causing the input threshold of the transistor Q76 to be increased resulting in a snap action. The circuit then returns to the first bistable state quickly.

Referring now in brief review to the operation of the remote meter reading system 13 having the metering modules 14 through 14N connected to a first meter 15 through a last meter 15N located at a remote meter encoding coding site. The first metering module 14 connects the system 13 at the start command input 24 and data out output 22 to a transmission line 19 connected to a central meter billing and decoding site. The following metering modules 14a through 14N are connected in series cascaded relationship with the start next readout output 42 of a preceding module circuit connected to the start command input 24 of a following module circuit and the data out output 22 of a following module connected to the data in input of the preceding module. The meter identification inputs 37, 38 and 39 are connected to program a predetermined three bit meter identification designation at each module and the memory pulser 35 is connected to the pulse-out output 34 and the memory in input 36 of each module. The system is operable when the voltage source VDD and clock pulse inputs 27 and 28 are energized by the common power supply and clock source 29. The power line conductors 30 establish the repetition rate of the clock pulses at the 60 Hz frequency.

In the meter reading monitoring and encoding mode of operation, each quantized meter reading increase produces a meter pulse 17 at the input 32 to the input/shaping circuit 45. The pulse shaping circuit produces the IN and $\overline{IN}$ counting logic signals first, to update the meter count of the non-volatile counter 46, second, to initiate a delayed pulse out signal from the delay circuit 55 and pulse generator 57, and, third, to internally reset the reset circuit 47 if it has initiated a counter reset pulse at the previous meter pulse 17. The pulse out signal initiates the memory clear/write pulse signal VM to set the memory portion of each counter stage of the non-volatile counter 46 to have a stored logic state corresponding to the logic state of the counter stage flip-flop. This operation is repeated in each accumulator portion of a metering module in response to a meter pulse 17. The non-volatile counter 46 is reset upon it reaching a count of one thousand by the reset circuit 47 initiating a reset logic signal at the reset input to the counter 46 or is externally reset by a signal on the external reset input 63.

Upon a power outage condition developing at the power line conductors 30, the voltage source VDD is interrupted deenergizing the metering module circuits. The meter count is stored in the memory sections of the non-volatile counter stages for at least 30 days which is substantially longer than any power line outages normally can be expected to occur. When the power line conductors 30 are reenergized the memory section of each non-volatile counter stage steers the corresponding flip-flop section to be biased to the same logic state as existed prior to the power outage. This provides the complementing non-volatile counter memory of the meter reading corresponding to the count which forms one important feature of this invention. The prejudiced biasing of the flip-flop circuits including the NOR gates 86 and 98 provides a safeguarding feature so that a false meter counting logic signal IN is not generated nor is a false counter reset logic signal to the non-volatile counter 46 following the power outage condition.

The readout cycle mode of operation of the remote meter reading system 13 is again reviewed by reference to the timing graphs of waveforms of FIG. 10 and the corresponding circuit locations of the signal waveforms in FIGS. 1 and 2. The clock pulses shown in top graph of FIG. 10 are continuously applied to the input 28, however, they are not used during the meter monitoring and encoding mode of operation since the start control/clock shaping circuit 50 inhibits them from the CLOCK logic output on output 68. When an interrogating signal is received from the central location at the data set 20 is typically will acknowledge receipt of the interrogating signal by sending a tone signal back to the central location and start command logic signal to the input 24 of the first remote metering module 14. This initiates readout of all the metering module in a series asynchronous data transmission format.

The top time graph of clock pulses in FIG. 10 indicated the number of the clock pulses starting with the first low to high or "1" state to "0" state transition following the start command signal, illustrated in the second from top graph, from the data set 20. This signal is a "0" to "1" state transition to provide a "1" state pulse duration slightly longer than the time required to readout all of the metering modules. The start command signal initiates the inhibit logic signal on line 74 to the input/shaping circuit to prevent the meter initiated pulses 17 from generating a meter counting logic signal IN. Concurrently, the clock pulses are enabled to be gated to the readout control counter 52 to form CLOCK logic pulses starting with the clock pulse 1. The readout control counter establishes the programmed readout time delay of a minimum of 15 bits (250 milliseconds at the 60 Hertz clock frequency). This time delay is maintained by the output line 70 of the readout control counter being maintained at the "1" state to inhibit the output buffer 54 from gating the output of the encoder 48 to the data out output 22.

The beginning of the sixteenth CLOCK logic pulse changes the state of the E counter stage in the readout counter 52 to end the programmed readout time delay of the first metering module 14. The "1" state is developed on the line 70 to enable the data out output 22 illustrated in the third graph from the top in FIG. 10. The start synchronizing S data word bit is developed when the encoder 48 is sampled by the $\overline{Q}$ outputs of the A through D stages being at the "1" state at the inputs to the encoder 48 during the sixteenth CLOCK bit to provide the "0" state on the encoder output 69 and the "1" state on the data out output 22. This start bit S is used to synchronize the decoding computer operation at the central billing location.

At the seventeenth through the twenty-sixth CLOCK logic pulses the non-volatile counter stages C1 through C10 are sampled by the encoder 48 under control of the readout control counter 52. The meter pulse count contained in the logic states of these counter stages establishes the corresponding "1" and "0" states of the data word bit positions B1 through B10 at the data out output 22. Also at the beginning of the seventeenth CLOCK logic pulse the $\overline{Q}$ output of the A counter stage in the control counter 52 goes to the "0" state and since the $\overline{Q}$ output of the E counter state is also at the "0" state the start-next-readout logic pulse is a "0" to "1" state transition, as shown in the fourth graph from the top in FIG. 10, on the start-next-readout output 42 of the module 14. This is applied to the start command input 24A of the next following metering chip 14A. The programmed readout delay is then initiated in the module 14A as described for chip 14.

The three meter identification ID1, ID2, and ID3 and the parity P logic positions in the encoder 48 are sampled by the control counter 52 and provide the data word bit positions at the twenty-seventh through the thirtieth CLOCK logic pulse intervals. At the thirty-first CLOCK pulse interval and the sixteenth data word bit position, the $\overline{Q}$ outputs of the A through E counter stages of the control counter 52 are all at the "0" state so that the encoder produces a "0" state on the data out output 22. Also, at the control counter output 78 a logic signal is provided at the thirty-first CLOCK bit to the circuit 51 to terminate the inhibit logic signal on the line 69 to the input/shaping circuit 45 and also disable the clock logic signals at the line 68 of the circuit 51. This maintains the control counter 52 count at 31 to maintain the output buffer 54 enabled to pass signals between data in input 43 and the data-out output 22 and the start-next-readout logic signal at the output 24 and the start command input to the following module 14A. The programmed readout delay interval in the following module 14A is completed at the end of the thirty-first clock pulse and the thirty-second clock pulse forms the sixteenth count of the clock logic signals in the following metering module 14A and the data word readout at the data out output 22A proceeds as described for the first metering module. This data word is applied to the preceding first metering module 14 at the data in input 43 and out the data out output 22 to the transmission line 19 in a serial data transmission mode as shown in FIG. 10.

The operation described continues through the data readout of the last metering module 14N. The transmission time for the 288 metering module in the one working embodiment can be accomplished in less than 2 minutes. The start command logic signal applied to the first metering module 14 from the data set 20 has the predetermined interval for slightly longer than time required to readout the encoded meter readings of all the metering modules and then returns the start command input 24 at the first metering module to the "0" state. Since the end E data word bit position is always left at the "0" logic state, the readout from the metering module 14N leaves the data out output 22 of the first metering module at the "0" state. The data set 20 disconnects the remote meter raeading system 13 from the transmission line 19 to end the system readout mode of operation.

It is to be understood that the remote meter reading system of this invention may be modified with obvious equivalents without departing from the spirit and scope of the invention. What we claim is:

1. A remote meter reading system for connecting each of plural meter pulse sources located at a remote location to a data transmission line terminating at a central location, wherein the system comprises: plural integral solid state remote metering circuit modules arranged consecutively including a first module and following modules being formed of field effect transistor active circuit elements having a common integrated circuit arrangement connected to a separate one of said meter pulse sources and wherein each said module includes, an input for receiving pulses from the associated meter pulse source and generating meter pulse logic signals in response thereto, a non-volatile binary counter including plural stages with each stage including a flip-flop stage formed by two counting logic elements and having an input responsive to said meter pulse logic signals and a binary meter pulse counting output and further includes a memory section including two non-volatile memory elements connected to said two counting logic elements and having an input responsive to said meter pulse logic signals to set the two non-volatile memory elements in opposite memory characteristics corresponding to the opposite states of said two counting logic elements so that upon an interruption of voltage energization of the binary counter the set memory characteristics of the memory elements return said two counting logic elements to the same opposite state as established prior to the interruption, said each module further including an encoder circuit including parallel data inputs connected to said binary meter pulse counting outputs of the counter stages and the encoder circuit further including sampling inputs and a serial data word output, said each module further including a clock signal input for receiving clock logic signals, said each module further including a start control circuit having a clock input connected to the clock signal input, and a start input responsive to a start next readout signal and an output gate means being enabled to develop said clock signals when said start signal is present, with said start input of said first module receiving a start command interrogation signal from said central location and each other start input receiving a start next readout signal from a preceding module, said each module further including a readout control circuit including a clock input receiving the clock signals at said output gate means, a binary counter having counter outputs connected to said sampling inputs and sequentially energized in response to said clock signals to develop said binary meter pulse outputs at said serial data word output of the encoder circuit during a predetermined number of counts at said counter outputs, and a start next readout signal output generated in each preceding module when the counter outputs develop an initial count not included in said predetermined counts, and each module further including an output buffer circuit including a gate circuit means having an input from said serial data word output of said encoder, an enabling input received from the counter outputs of said readout control circuit during said predetermined number of counts, a data out output, and a data in input wherein each data in input of a preceding module is connected to the data out output of a following module with the data out output of said first module connected to said transmission line such that each module produces the associated encoder circuit serial data word output and then the serial data word output of the following module at the data out output, whereby said remote metering circuit modules are connected together in a cascaded consecutive arrangement so that receipt of said start command signal at said firt module effects continuous serial readout of the encoder circuit serial data word outputs of the plural modules.

2. The system as claimed in claim 1 wherein said non-volatile binary counter includes plural stages each including MNOS memory elements having variable threshold levels which are maintained during said deenergized state.

3. The system as claimed in claim 1 wherein the encoder serial data word output includes a format of bit positions each generated by a clock pulse with said format having a synchronizing bit position, meter pulse counting output bit positions, predetermined meter identification bit positions, a parity check bit position and an end bit position.

4. The system as claimed in claim 3 wherein non-volatile binary counter has ten meter pulse counting outputs and wherein there are three meter identification bit positions such that the data word format includes 16 bit positions.

5. The system as claimed in claim 1 including an external source of clock pulses connected to said clock signal input and having a 60 Hertz source of clock pulses having a 60 Hertz frequency applied to establish the counting of the binary counter of said readout control circuit and wherein the last named counter has a maximum count of 32 clock pulses and the predetermined number of counts is 16 so that said data word output has 16 bit positions generated by the seventeenth through thirty-second clock pulses counted by the binary counter.

6. The system as claimed in claim 1 wherein said counter of said readout control circuit includes a gate means responsive to a programmed delay interval established between said initial count and the beginning of said predetermined number of counts for initiating said start-next-readout signal.

7. An integral solid state remote metering circuit module for encoding and transmitting meter readings in a predetermined binary word format to a central location, said remote metering circuit module comprising:
 a power supply input for receiving an energizing voltage for the module;
 an input circuit means responsive to meter pulses representing quantized meter measurements, said input circuit including pulse conditioning means for generating first meter pulse responsive logic signals;
 a pulse delay circuit means responsive to said first meter pulse responsive logic signals for generating a second meter pulse responsive logic signal following each first meter pulse responsive signal;
 a non-volatile binary ripple through canter including plural stages each including a flip-flop section having binary states responsive to said first meter pulse responsive logic signals for accumulating and totalizing the received meter pulses and each stage further including a bistable memory section responsive to said second meter pulse responsive for establishing a bistable state corresponding to the state of the associated flip-flop section so that the memory section retains the one established bistable state during a deenergized condition of the energizing voltage at the non-volatile counter to return the flip-flop sections to the same binary state as established therein prior to the deenergized condition and thereby maintain an accumulated binary count of the meter pulses;
 a parallel to serial converter encoding circuit having an encode input connected to the output of each of the flip-flop sections of said non-volatile counter for receiving the accumulated binary count of said non-volatile counter, said encoding circuit further having a sampling input and an output;
 a clock signal input for receiving clock logic signals;
 a readout control counter means having an input enabled to receive said clock logic signals in response to an interrogating command signal generated at said central location and an output energizing said sampling input of the encoding circuit at a rate determined by said clock logic signals so as to generate serial logic bits defining a data word readout in said binary word format at the output of said encoding circuit wherein the data word format includes said accumulated binary count of said meter initiated pulses; and an output buffer circuit for applying said data word readout to an external circuit.

8. The remote metering circuit module as claimed in claim 7 wherein said non-volatile counter includes a reset input and the module includes a counter reset signal source connected to said reset input and being responsive to a predetermined accumulated count of the meter pulses to thereupon reset said non-volatile counter to a predetermined initial count corresponding to zero.

9. The remote metering circuit module as claimed in claim 7 including a start control circuit including a first gating means responsive to an external source of clock pulses and said interrogating command signal, said gate means being enabled by said interrogating command signal to enable said clock logic signals to be applied to said readout control counter means such that said encoding circuit data word readout is generated in response to a predetermined number of counts of said readout control counter means following receipt of said interrogating signal at said start control circuit.

10. The remote metering circuit module as claimed in claim 7 wherein said input circuit includes a gating circuit responsive to said meter pulses and to said predetermined count of said readout control counter means and to said interrogating command signal to inhibit said meter pulse responsive logic signals to said non-volatile binary counter during the data word readout.

* * * * *